(12) United States Patent
Andersson et al.

(10) Patent No.: US 11,243,319 B2
(45) Date of Patent: Feb. 8, 2022

(54) METHOD FOR SEISMIC DATA ACQUISITION AND PROCESSING

(71) Applicant: Apparition Geoservices GmbH, Pfäffikon SZ (CH)

(72) Inventors: Fredrik Andersson, Pfäffikon (CH); Johan Robertsson, Wald (CH)

(73) Assignee: Apparition Geoservices GmbH, Pfäffikon SZ (CH)

( * ) Notice: Subject to any disclaimer, the term of this patent is extended or adjusted under 35 U.S.C. 154(b) by 0 days.

(21) Appl. No.: 17/011,315

(22) Filed: Sep. 3, 2020

(65) Prior Publication Data
US 2020/0400846 A1   Dec. 24, 2020

Related U.S. Application Data

(63) Continuation of application No. PCT/IB2019/051440, filed on Feb. 21, 2019.

(30) Foreign Application Priority Data

Mar. 5, 2018 (GB) .................................... 1803535

(51) Int. Cl.
*G01V 1/30* (2006.01)
*G01V 1/00* (2006.01)
*G01V 1/36* (2006.01)

(52) U.S. Cl.
CPC .............. *G01V 1/307* (2013.01); *G01V 1/005* (2013.01); *G01V 1/364* (2013.01); *G01V 2210/50* (2013.01)

(58) Field of Classification Search
CPC ........ G01V 1/307; G01V 1/005; G01V 1/364; G01V 2210/50
See application file for complete search history.

(56) References Cited

U.S. PATENT DOCUMENTS

| 7,250,944 B2 * | 7/2007 | Anderson | G06F 30/30 345/419 |
| 7,849,347 B2 * | 12/2010 | Armstrong | G06F 9/4856 713/500 |
| 10,690,793 B2 * | 6/2020 | Van Manen | G01V 1/005 |
| 2014/0278119 A1 | 9/2014 | Halliday et al. | |
| 2017/0371053 A1 | 12/2017 | Poole et al. | |
| 2019/0079205 A1 | 3/2019 | Van Manen et al. | |

FOREIGN PATENT DOCUMENTS

GB      2550181 A      11/2017

OTHER PUBLICATIONS

International Search Report and Written Opinion dated Jul. 5, 2019 in PCT/IB2019/051440, 11 pages.
(Continued)

*Primary Examiner* — Elias Desta
(74) *Attorney, Agent, or Firm* — Oblon, McClelland, Maier & Neustadt, L.L.P.

(57) ABSTRACT

Methods for separating the unknown contributions of two or more sources from a commonly acquired set of wavefield signals based on varying parameters at the firing time, location and/or depth of the individual sources in a lateral 2D plane.

20 Claims, 10 Drawing Sheets

| 1401 | Encode at least two different sources relative to each other for shotpoints acquired along single simultaneous acquisition lines (together comprising the first activation line) along a first spatial direction to enable the separation of the sources along a single activation line |
| 1402 | Encode the at least two different sources relative to each other along adjacent activation lines distributed along a second spatial direction, by encoding the at least two different sources relative to each other in such a way that the periodicity of the obtained wavefield is different than the periodicity as determined by the sampling parameters in the case that the varying is omitted |
| 1403 | Obtain wavefield recordings along the activation lines comprising the data generated by the at least two different sources |
| 1404 | The separated contributions of the at least two different sources acquired along the set of activation lines are generated using knowledge of the varying along the second spatial direction to at least partially resolve ambiguity which would be present if the varying is omitted |
| 1405 | Generating subsurface representations of structures or Earth media properties using the separated contribution of at least one of the at least two sources |
| 1406 | Output the generated subsurface representations |

(56) References Cited

OTHER PUBLICATIONS

Kurt Eggenberger et al: "Signal apparition applied to towed marine simultaneous sources—a case study on synthesized real data from the Viking Graben", First Break, vol. 34, No. 11, XP055373624, Nov. 30, 2016, pp. 81-88.

J. O. A. Robertsson et al., "We LHR2 05; Wavefield Signal Apparition, Part I—Theory", 78th EAGE Conference & Exhibition 2016 Vienna, Austria, XP055373628, May 30-Jun. 2, 2016, pp. 1-5.

Johan O. A. Robertsson et al., "Signal apparition for simultaneous source wavefield separation", Geophysical Journal International, XP055448250, Aug. 1, 2016, pp. 1301-1305, DOI: 10.1093/gji/ggw210, Retrieved from the Internet: URL:https://library.seg.org/doi/pdf/10.1190/segam2016-13859951.1.

J.O.A. Robertsson et al., "Z015; Full-wavefield, Towed-marine Seismic Acquisition and Applications", 74th EAGE Conference & Exhibition incorporating SPE EUROPEC 2012, Copenhagen, Denmark, Jun. 2012, 5 pages.

C. J.Beasley et al., "A new look at simultaneous sources", 68th Annual International Meeting, SEG, Expanded Abstracts, 1998, pp. 133-136.

W. Lynn et al., "Experimental investigation of inteference from other seismic crews". Geophysics, 52, 1987, pp. 1501-1524

Stefani et al., "Acquisition using simultaneous sources", 69th Annual International Conference and Exhibition, EAGE, Extended Abstracts, B006, 2007.

L. T. Ikelle, "Coding and Decoding: Seismic Data: The Concept of Multishooting", Handbook of Geophysical Exploration: Seismic Exploration, Chapter 4 (Elsevier, 2010), vol. 39, 2010, pp. 293-341.

R. Kumar et al., Source separation for simultaneous towed-streamer marine acquisition—A compressed sensing approach Geophysics. 80, WD73-WD88, 2015, 16 pages.

N. Moldoveanu et al.,"Full-azimuth imaging using circular geometry acquisition", The Leading Edge, 27(7), 2008, pp. 908-913. doi: 10.1190/1.2954032.

P. Akerberg et al., "Simultaneous source separation by sparse Radon transform", 78th Annual International Meeting, SEG, Expanded Abstracts, 2008, pp. 2801-2805, doi:10.1190/1.3063927.

E. Shipilova et al., "Simultaneous-source seismic acquisitions: do they allow reservoir characterization? A feasibility study with blended onshore real data", 86th Annual International Meeting, SEG, Expanded Abstracts, 2016, 6 pages.

A. Ziolkowski, 1987, "The determination of the far-field signature of an interacting array of marine seismic sources from near field measurements: Results from the Delft Air Gun experiment", First Break, vol. 5, No. 1, 1987, 15 pages.

R. Abma et al. "Independent simultaneous source acquisition and processing". Geophysics, 80, WD37-WD44, 2015, 8 pages.

W. R. Hamilton, "II. On quaternions; or on a new system of imaginaries in algebra", The London, Edinburgh, and Dublin Philosophical Magazine and Journal of Science 25.163: 10-13, (1844), 5 pages.

M. B. Mueller et al., "The benefit of encoded source sequences for simultaneous source separation", Geophysics. vol. 80, No. 5 (Sep.-Oct. 2015); p. V133-V143, 8 Figs. 2015, 11 pages.

E. Hager, "Marine Seismic Data: Faster, Better, Cheaper?", GeoExpro, vol. 13, No. 4, 2016, 12 pages.

Bracewell, 1999, The Fourier Transform & Its Applications (McGraw-Hill Science, 1999, 7 pages.

F. Andersson et al., "Seismic apparition dealiasing using directionality regularization", 2016 SEG annual meeting, Dallas, 4 pages.

F. Andersson et al., "Express Letters: Flawless diamond separation in simultaneous source acquisition by seismic apparition", Geophysical Journal International, 209 (3), pp. 1735-1739.

Van der Blij, "History of the octaves", Simon Stevin .34, 1961, pp. 106-125.

J. D. H. Smith, "A left loop on the 15-sphere" Journal of Algebra 176.1, 1995, pp. 128-138.

* cited by examiner

METHOD FOR SEISMIC DATA ACQUISITION AND PROCESSING

CROSS-REFERENCE TO RELATED APPLICATIONS

This application is a continuation of PCT Application No. PCT/IB2019/051440, filed Feb. 21, 2019, which claims priority to Great Britain Application No. 1803535.2, filed Mar. 5, 2018. The entire contents of the above-identified applications are incorporated herein by reference.

FIELD

The present disclosure relates to methods for acquiring and separating contributions from two or more different simultaneously or near simultaneously emitting sources in a common set of measured signals representing a wavefield. In particular, the present disclosure relates to acquiring and separating contributions from two or more sources acquired at positions in a 2D lateral plane encoded by means of the simultaneous source methods such as, but not limited to, the method of signal apparition or methods using random dithering to encode sources. The inventions would apply equally to onshore and offshore seismic surveys, and for implosive, explosive or vibratory type sources.

BACKGROUND

Seismic data can be acquired in land, marine, seabed, transition zone and boreholes for instance. Depending on in what environment the seismic survey is taking place the survey equipment and acquisition practices will vary.

In towed marine seismic data acquisition a vessel tows streamers that contain seismic sensors (hydrophones and sometimes particle motion sensors). A seismic source usually but not necessarily towed by the same vessel excites acoustic energy in the water that reflects from the subsurface and is recorded by the sensors in the streamers. The seismic source is typically an array of airguns customarily deployed as a set of sub-arrays, each of which includes a set of individual airguns. These are normally programmed to fire at the same instant, providing a close to instantaneous peak of energy followed by a longer, lower energy output as a result of oscillating air bubbles. A marine source can also be a marine vibrator for instance, which may be a single unit or a set of individual units composing an array. In either case, the intent is to provide a seismic source output which contains as far as possible a broad range of frequencies within the usable seismic frequency ranges, typically from 1-2 Hz up to around 500 Hz. In modern marine seismic operations many streamers are towed behind the vessel (3D seismic data acquisition). It is also common that several source and/or receiver vessels are involved in the same seismic survey in order to acquire data that is rich in offsets and azimuths between source and receiver locations.

In seabed seismic data acquisition, nodes or cables containing sensors (hydrophones and/or particle motion sensors) are deployed on the seafloor. These sensors can also record the waves on and below the seabottom and in particular shear waves which are not transmitted into the water. Similar sources are used as in towed marine seismic data acquisition. The sources are towed by one or several source vessels.

In land seismic data acquisition, the sensors on the ground are typically geophones and the sources are commonly vibroseis trucks. Vibroseis trucks are usually operated in arrays with two or more vibroseis trucks emitting energy close to each other roughly corresponding to the same shot location. In this invention we refer to such source configurations as groups of sources.

The general practice of marine and seabed seismic surveying is further described below in relation to FIG. 12.

Prospecting for subsurface hydrocarbon deposits (701) in a marine environment (FIG. 12) is routinely carried out using one or more vessels (702) towing seismic sources (703-705). The one or more vessels can also tow receivers or receivers (706-708) can be placed on the seabed (714).

Seismic sources typically employ a number of so-called airguns (709-711) which operate by repeatedly filling up a chamber in the gun with a volume of air using a compressor and releasing the compressed air at suitable chosen times (and depth) into the water column (712).

The sudden release of compressed air momentarily displaces the seawater, imparting its energy on it, setting up an impulsive pressure wave in the water column propagating away from the source at the speed of sound in water (with a typical value of around 1500 m/s) (713).

Upon incidence at the seafloor (or seabed) (714), the pressure wave is partially transmitted deeper into the subsurface as elastic waves of various types (715-717) and partially reflected upwards (718). The elastic wave energy propagating deeper into the subsurface partitions whenever discontinuities in subsurface material properties occur. The elastic waves in the subsurface are also subject to an elastic attenuation which reduces the amplitude of the waves depending on the number of cycles or wavelengths.

Some of the energy reflected upwards (720-721) is sensed and recorded by suitable receivers placed on the seabed (706-708), or towed behind one or more vessels. The receivers, depending on the type, sense and record a variety of quantities associated with the reflected energy, for example, one or more components of the particle displacement, velocity or acceleration vector (using geophones, mems [microelectromechanical] or other devices, as is well known in the art), or the pressure variations (using hydrophones). The wave field recordings made by the receivers are stored locally in a memory device and/or transmitted over a network for storage and processing by one or more computers.

Waves emitted by the source in the upward direction also reflect downward from the sea surface (719), which acts as a nearly perfect mirror for acoustic waves.

One seismic source typically includes one or more airgun arrays (703-705): that is, multiple airgun elements (709-711) towed in, e.g., a linear configuration spaced apart several meters and at substantially the same depth, whose air is released (near-) simultaneously, typically to increase the amount of energy directed towards (and emitted into) the subsurface.

Seismic acquisition proceeds by the source vessel (702) sailing along many lines or trajectories (722) and releasing air from the airguns from one or more source arrays (also known as firing or shooting) once the vessel or arrays reach particular pre-determined positions along the line or trajectory (723-725), or, at fixed, pre-determined times or time intervals. In FIG. 12, the source vessel (702) is shown in three consecutive positions (723-725), also called shot positions.

Typically, subsurface reflected waves are recorded with the source vessel occupying and shooting hundreds of shots positions. A combination of many sail-lines (722) can form, for example, an areal grid of source positions with associated inline source spacings (726) and crossline source spacings. Receivers can be similarly laid out in one or more lines forming an areal configuration with associated inline receiver spacings (727) and crossline receiver spacings.

The general practice of land seismic surveying is further described below in relation to FIG. 13.

Prospecting for subsurface hydrocarbon deposits (801) in a land environment (FIG. 13) is routinely carried out using one or more groups of so-called seismic vibrators (802-805) or other sources such as shotpipes or dynamite (not shown). Seismic vibrators transform energy provided by, e.g., a diesel engine into a controlled sequence of vibrations that radiate away from the vibrator as elastic waves (806). More specifically, elastic waves emanate from a baseplate (807), connected to a movable element whose relative motion realizes the desired vibrations through a piston-reaction mass system driven by an electrohydraulic servo valve. The baseplate (807) is applied to the ground for each vibration, then raised up so that the seismic vibrator can drive to another vibrating point (indicated by solid markers such as triangles, circles, squares and pentagons in FIG. 13). To transmit maximum force into the ground and to prevent the baseplate from jumping, part of the weight of the vibrator is used to hold down the baseplate.

Thus, one group of seismic sources could consist of the "array" of vibrators 802 and 803, while a second group of sources consists, e.g., of vibrators 804 and 805.

The elastic waves radiating away from the baseplate of the vibrators scatter, reflect (808) and refract (809) at locations or interfaces in the subsurface where the relevant material properties (e.g., mass density, bulk modulus, shear modulus) vary and are recorded at hundreds of thousand of individual/single sensors (810) or at thousands of sensor groups (811). Sensor signals from one or more sensors in a group can be combined or summed in the field before being sent sent to the recording truck (812) over cables or wirelessly.

Source positions may lie along straight lines (814) or various other trajectories or grids. Similarly, receiver positions may lay along lines oriented in a similar direction as the source lines, e.g., 820, and/or oriented perpendicularly to the source lines (821). Receivers may also be laid out along other trajectories or grids. The source spacing along the line (815) is the distance the source in a group move between consecutive shotpoints. The inter source spacing (816) is the distance between two sources in the same source group. Similarly, the receiver spacing is the spacing between individual receivers (e.g., 818) in case single sensors or between sensor groups (e.g., 817). The source line spacing (819) is some representative distance between substantially parallel source lines and similarly for the receiver line spacing. Waves may be affected by perturbations in the near surface (813) which obscure the deeper structure of interest (i.e., possible hydrocarbon bearing formations). In land seismic data acquisition, the sensors on the ground are typically geophones.

Explosive sources may also be used onshore, which may be one large charge or a series of smaller ones.

Impulsive marine sources are traditionally formed from a combination of individual energy emitting source elements, typically being of the airgun type, by which a volume of compressed air is released into the water column to produce energy in the preferred frequency spectrum. Each airgun element is typically deployed a few metres below the surface, arranged into arrays of similar units.

There are various brand names and designs of such units, including but not limited to Sleeve Guns, GI Guns and Bolt Airguns and donut guns. All such units work in a similar way and will be referred to herein as "airgun" for the sake of convenience.

Each individual airgun unit has a specific volume of air, which can be configured by the user. As each unit is initiated, the air volume is ejected almost instantaneously into the water column, and the resulting bubble rises towards the surface, oscillating with a given periodicity with decaying amplitude. This continues for up to a second or two. The periodicity is a function of the volume and pressure of the air.

Individual airgun elements are combined into sub-arrays in various configurations, consisting of airguns with a range of volumes such that the bubble periodicity is different for each airgun element. Airgun units are commonly combined together in such sub-arrays such that the overall output consists of a short, aligned initial output (referred to as the "peak"), followed by a period in which the various bubble periodicity times result in largely destructive interference, in order to make the overall radiating pressure wave, referred to as the sub-array signature, as close as possible to the idealized spike. Such a process is referred to as sub-array tuning, and the techniques involved in this are well established practice and beyond the scope of this description.

Following the firing of a shot, after a short period of time, since the source vessel is moving continuously, a subsequent shot is fired after a few seconds. This is generally between five and twenty seconds for mainstream seismic acquisition. The objective, quite apart from giving time for the source vessel to move, is also to allow the energy from each shot-point to decay before the next one is initiated. Some approaches use shorter shot intervals (two or more seconds), often but not universally combined with some element of timing change on sequential shots in order to limit the impact of the insufficient decay time on sequential shot records. These approaches are referred to as "simultaneous source" and are discussed below. These approaches enable more source points per unit area, albeit at some compromise in terms of interference or fold.

In the description below we focus on sources towed by a single vessel. However, the present invention also applies to sources towed by several vessels.

Traditionally seismic data have been acquired sequentially: an impulsive source, typically formed of two or more airgun sub-arrays or vibroseis units is excited and data are recorded until the energy that comes back has diminished to an acceptable level and all reflections of interest have been captured after which a new shot at a different shot location is excited. Being able to acquire data from several sources at the same time is clearly highly desirable. Not only would it allow to cut expensive acquisition time drastically but it could also better sample the wavefield on the source side which typically is much sparser sampled than the distribution of receiver positions. It would also allow for better illumination of the target from a wide range of azimuths as well as to better sample the wavefield in areas with surface obstructions. In addition, for some applications such as 3D VSP acquisition, or marine seismic surveying in environmentally sensitive areas, reducing the duration of the survey is critical to save costs external to the seismic acquisition itself (e.g., down-time of a producing well) or minimize the impact on marine life (e.g., avoiding mating or spawning seasons of fish species).

Simultaneously emitting sources, such that their signals overlap in the (seismic) record, is also known in the industry as "blending". Conversely, separating signals from two or more simultaneously emitting sources is also known as "deblending" and the data from such acquisitions as "blended data".

Simultaneous source acquisition has a long history in land seismic acquisition dating back at least to the early 1980's. Commonly used seismic sources in land acquisition are vibroseis sources which offer the possibility to design source signal sweeps such that it is possible to illuminate the sub-surface "sharing" the use of certain frequency bands to avoid simultaneous interference at a given time from different sources. By carefully choosing source sweep functions, activation times and locations of different vibroseis sources, it is to a large degree possible to mitigate interference between sources. Such approaches are often referred to as slip sweep acquisition techniques. In marine seismic data contexts the term overlapping shooting times is often used for related practices. Moreover, it is also possible to design sweeps that are mutually orthogonal to each other (in time) such that the response from different sources can be isolated after acquisition through simple cross-correlation procedures with sweep signals from individual sources. We refer to all of these methods and related methods to as "time encoded simultaneous source acquisition" methods and "time encoded simultaneous source separation" methods.

The use of simultaneous source acquisition in marine seismic applications is more recent as marine seismic sources (i.e., airgun sources) do not appear to yield the same benefits of providing orthogonal properties as land seismic vibroseis sources, at least not at a first glance. Western Geophysical was among the early proponents of simultaneous source marine seismic acquisition suggesting to carry out the separation as a pre-processing step by assuming that the reflections caused by the interfering sources have different characteristics. Beasley et al. (1998) exploited the fact that provided that the sub-surface structure is approximately layered, a simple simultaneous source separation scheme can be achieved for instance by having one source vessel behind the spread acquiring data simultaneously with the source towed by the streamer vessel in front of the spread. Simultaneous source data recorded in such a fashion is straightforward to separate after a frequency-wavenumber ($\omega$k) transform as the source in front of the spread generates data with positive wavenumbers only whereas the source behind the spread generates data with negative wavenumbers only.

Another method for enabling or enhancing separability is to make the delay times between interfering sources incoherent (Lynn et al., 1987). Since the shot time is known for each source, they can be lined up coherently for a specific source in for instance a common receiver gather or a common offset gather. In such a gather all arrivals from all other simultaneously firing sources will appear incoherent. To a first approximation it may be sufficient to just process the data for such a shot gather to final image relying on the processing chain to attenuate the random interference from the simultaneous sources (aka. passive separation). However, it is of course possible to achieve better results for instance through random noise attenuation or more sophisticated methods to separate the coherent signal from the apparently incoherent signal (Stefani et al., 2007; Ikelle 2010; Kumar et al. 2015). In recent years, with elaborate acquisition schemes to for instance acquire wide azimuth data with multiple source and receiver vessels (Moldoveanu et al., 2008), several methods for simultaneous source separation of such data have been described, for example methods that separate "random dithered sources" through inversion exploiting the sparse nature of seismic data in the time-domain (i.e., seismic traces can be thought of as a subset of discrete reflections with "quiet periods" in between; e.g., Akerberg et al., 2008; Kumar et al. 2015). A recent state-of-the-art land example of simultaneous source separation applied to reservoir characterization is presented by Shipilova et al. (2016). Existing simultaneous source acquisition and separation methods based on similar principles include quasi random shooting times, and pseudo random shooting times. We refer to all of these methods and related methods to as "random dithered source acquisition" methods and "random dithered source separation" methods. "Random dithered source acquisition" methods and "random dithered source separation" methods are examples of "space encoded simultaneous source acquisition" methods and "space encoded simultaneous source separation" methods.

A different approach to simultaneous source separation has been to modify the source signature emitted by airgun sources. Airgun sources comprise multiple (typically three) sub-arrays each comprised of several individual airguns or clusters of smaller airguns. Whereas in contrast to land vibroseis sources, it is not possible to design arbitrary source signatures for marine airgun sources, one in principle has the ability to choose firing time (and amplitude i.e., volume) of individual airgun elements within the array. In such a fashion it is possible to choose source signatures that are dispersed as opposed to focused in a single peak. Such approaches have been proposed to reduce the environmental impact in the past (Ziolkowski, 1987) but also for simultaneous source shooting.

Abma et al. (2015) suggested to use a library of "popcorn" source sequences to encode multiple airgun sources such that the responses can be separated after simultaneous source acquisition by correlation with the corresponding source signatures following a practice that is similar to land simultaneous source acquisition. The principle is based on the fact that the cross-correlation between two (infinite) random sequences is zero whereas the autocorrelation is a spike. It is also possible to choose binary encoding sequences with better or optimal orthogonality properties such as Kasami sequences to encode marine airgun arrays (Robertsson et al., 2012). Mueller et al. (2015) propose to use a combination of random dithers from shot to shot with deterministically encoded source sequences at each shot point. Similar to the methods described above for land seismic acquisition we refer to all of these methods and related methods to as "time encoded simultaneous source acquisition" methods and "time encoded simultaneous source separation" methods.

Yet another approach is to fire a sequence of source arrays, one or more of which has a random time dither applied relative to the adjacent source points, but at a shorter time interval, for example, five seconds rather than the conventional ten. This has the advantage of keeping the shallow part of each shot free from interference, whilst mitigating the drop in fold. For example, conventional exploration seismic involves two identical source arrays, offset laterally from each other by, for example, 50 m (source centre to source centre). The firing cycle is Port—starboard—port—starboard, such that a source fires every ten seconds, into different sub-surface lines. This results in half-fold data relative to single source. Experiments with triple source using the same approach resulted in ⅓ fold data, considered insufficient. The partially overlapping approach in the above dual source example, would involve firing every 5 seconds, returning to full fold. Employing the same approach with three partially overlapping sources and a five second shot interval would result in limited fold drop and undisturbed shallow data. However, extrapolating this form three to four sources, for example (and temporarily ignoring the issues outlined above about overall sub-array capacity) would require, for example, a 2-3 second shot interval, resulting in limited undisturbed data lengths and loss of fold. Taking into consideration the practicalities, it has also been presented (for example, Hager, 2016), to arrange the firing sequence such that individual airgun sub-arrays may form part of more than one array, as noted above. However, the interference of adjacent shots (even mitigated by dither) and the loss of fold are unavoidable and their effects increase as attempts are made to increase the total number of arrays.

Recently there has been an interest in industry to explore the feasibility of marine vibrator sources as they would, for instance, appear to provide more degrees of freedom to optimize mutually orthogonal source functions beyond just binary orthogonal sequences that would allow for a step change in simultaneous source separation of marine seismic data. Halliday et al. (2014) suggest to shift energy in $\omega k$-space using the well-known Fourier shift theorem in space to separate the response from multiple marine vibrator sources. Such an approach is not possible with most other seismic source technology (e.g., marine airgun sources) which lack the ability to carefully control the phase of the source signature (e.g., flip polarity).

The recent development of "signal apparition" suggests an alternative approach to deterministic simultaneous source acquisition that belongs in the family of "space encoded simultaneous source acquisition" methods and "space encoded simultaneous source separation" methods. Robertsson et al. (2016) show that by using modulation functions from shot to shot (e.g., a short time delay or an amplitude variation from shot to shot), the recorded data on a common receiver gather or a common offset gather will be deterministically mapped onto known parts of for instance the $\omega k$-space outside the conventional "signal cone" where conventional data is strictly located (FIG. 1$a$). The signal cone contains all propagating seismic energy with apparent velocities between water velocity (straight lines with apparent slowness of $+-\frac{1}{1500}$ s/m in $\omega k$-space) for the towed marine seismic case and infinite velocity (i.e., vertically arriving events plotting on a vertical line with wavenumber 0). The shot modulation generates multiple new signal cones that are offset along the wavenumber axis thereby populating the $\omega k$-space much better and enabling exact simultaneous source separation below a certain frequency (FIG. 1$b$). Robertsson et al. (2016) referred to the process as "signal apparition" in the meaning of "the act of becoming visible". In the spectral domain, the wavefield caused by the periodic source sequence is nearly "ghostly apparent" and isolated. A critical observation and insight in the "signal apparition" approach is that partially shifting energy along the $\omega k$-axis is sufficient as long as the source variations are known as the shifted energy fully predicts the energy that was left behind in the "conventional" signal cone. Following this methodology simultaneously emitting sources can be exactly separated using a modulation scheme where for instance amplitudes and or firing times are varied deterministically from shot to shot in a periodic pattern.

Consider a seismic experiment where a source is excited sequentially for multiple source locations along a line while recording the reflected wavefield on at least one receiver. The source may be characterized by its temporal signature. In the conventional way of acquiring signals representing a wavefield the source may be excited using the same signature from source location to source location, denoted by integer n. Next, consider the alternative way of acquiring such a line of data using a periodic sequence of source signatures: every second source may have a constant signature and every other second source may have a signature which can for example be a scaled or filtered function of the first source signature. Let this scaling or convolution filter be denoted by a(t), with frequency-domain transform $A(\omega)$. Analyzed in the frequency domain, using for example a receiver gather (one receiver station measuring the response from a sequence of sources) recorded in this way, can be constructed from the following modulating function m(n) applied to a conventionally sampled and recorded set of wavefield signals:

$$m(n) = \frac{1}{2}[1+(-1)^n] + \frac{1}{2}A[1-(-1)^n],$$

which can also be written as $$m(n) = \frac{1}{2}[1+e^{i\pi n}] + \frac{1}{2}A[1-e^{i\pi n}]. \quad (0.1)$$

By applying the function m in Eq. 0.1 as a modulating function to data $f(n)$ before taking a discrete Fourier transform in space (over n), $F(k) = \mathcal{F}(f(n))$, the following result can be obtained:

$$\mathcal{F}(f(n)m(n)) = \frac{1+A}{2}F(k) + \frac{1-A}{2}F(k-k_N), \quad (0.2)$$

which follows from a standard Fourier transform result (wavenumber shift) (Bracewell, 1999).

Eq. 0.2 shows that the recorded data $f$ will be scaled and replicated into two places in the spectral domain as illustrated in FIG. 1, part (B) and as quantified in Tab. I for different choices of $A(\omega)$.

TABLE I

Mapping of signal to cone centered at $k = 0$ ($H_+$) and cone centered at $k = k_N$ ($H_-$) for different choices of $A(\omega)$ for signal separation or signal apparition in Eq. (0.2).

| $A(\omega)$ | $H_- = (1 - A)/2$ | $H_+ = (1 + A)/2$ |
|---|---|---|
| 1 | 0 | 1 |
| −1 | 1 | 0 |
| 0 | ½ | ½ |
| ½ | ¼ | ¾ |
| $e^{i\omega T}$ | $(1 - e^{i\omega T})/2$ | $(1 + e^{i\omega T})/2$ |
| $1 + e^{i\omega T}$ | $-e^{i\omega T}/2$ | $1 + e^{i\omega T}/2$ |

Part of the data will remain at the signal cone centered around k=0 (denoted by $H_+$ in FIG. 1, part (B)) and part of the data will be scaled and replicated to a signal cone centered around $k_N$ (denoted by $H_-$). It can be observed that by only knowing one of these parts of the data it is possible to predict the other.

This process may be referred to as, "signal apparition" in the meaning of "the act of becoming visible". In the spectral domain, the wavefield caused by the periodic source sequence is nearly "ghostly apparent" and isolated.

In practice the length of the source sequences is finite. While it is true that the Fourier series transform of any finite sequence will be periodic with a periodicity related to the length of the sequence, this type of periodicity is not what we refer to when describing periodic constraints in the current invention. Instead, in this invention we use the term periodic to denote a sequence that repeats itself at least once within the length of the sequence (i.e., the periodicity is less than half the sequence length).

A particular application of interest that can be solved by using the result in Eq. (0.2) is that of simultaneous source separation. Assume that a first source with constant signature is moved along an essentially straight line with uniform sampling of the source locations where it generates the wavefield g. Along another essentially straight line a second source is also moved with uniform sampling. Its signature is varied for every second source location according to the deterministic modulating sequence 700, generating the wavefield h. The summed, interfering data $f=g+h$ are recorded at a receiver location.

In the frequency-wavenumber domain, where the recorded data are denoted by $F=G+H$, the H-part is partitioned into two components $H_+$ and $H_-$ with $H=H_+ +H_-$ where the $H_-$-component is nearly "ghostly apparent" and isolated around the Nyquist-wavenumber [FIG. 1, part (B)], whereas G and $H_+$ are overlapping wavefields around $k=0$. Furthermore, $H_-$ is a known, scaled function of H. The scaling depends on the chosen $A(\omega)$ function (Tab. I), and can be deterministically removed, thereby producing the full appearance of the transformed wavefield H. When H is found, then $G=F-H$ yielding the separate wavefields g and h in the time-space domain.

Although the above description has focused on acquisition along essentially straight lines, the methodology applies equally well to curved trajectories such as coil-shaped trajectories, circles, or other smoothly varying trajectories or sequences of source activations.

The concept may be extended to the simultaneous acquisition of more than two source lines by choosing different modulation functions for each source.

Acquiring a source line where the first two source locations have the same signature, followed by two again with the same signature but modified from the previous two by the function $A(\omega)$ and then repeating the pattern again until the full source line has been acquired, will generate additional signal cones centered around $+k_N/2$.

FIG. 1, part (B) also illustrates a possible limitation of signal apparition. The $H_+$ and $H_-$ parts are separated within the respective lozenge-shaped regions in FIG. 1, part (B). In the triangle-shaped parts they interfere and may no longer be separately predicted without further assumptions. In the example shown in FIG. 1, part (B), it can therefore be noted that the maximum non-aliased frequency for a certain spatial sampling is reduced by a factor of two after applying signal apparition. Assuming that data are adequately sampled, the method nevertheless enables full separation of data recorded in wavefield experimentation where two source lines are acquired simultaneously.

For data acquired along a single line, the dimension of the lozenge-shaped regions is a function of the velocity of the recording medium c, the number of simultaneously emitting sources n and the distance between source firing locations along the direction of the source line $\Delta x$. The frequency at the top of the lozenge-shaped regions, $f_{top}$, is:

$$f_{top} = \frac{c}{n\Delta x}. \quad (0.3)$$

The frequency at the middle of the lozenge-shaped regions, $f_{mid}$, below which the data are fully separated is:

$$f_{mid} = \frac{c}{2n\Delta x}. \quad (0.4)$$

Outside the lozenge-shaped region the response from the sources is not separated and overlap. Different methods for separating the wavefield contributions from the different sources in this region have been proposed, many of which rely on the exact or nearly exact separation of the wavefields within the lozenge-shaped regions (e.g., Andersson et al., 2016). Therefore, the larger the lozenge-shaped region is the larger area can first of all be exactly or nearly exactly reconstructed. However, in addition a larger lozenge-shaped region will also enhance the quality of separating wavefields in the overlapping region.

Instead of using the method of signal apparition, other methods for simultaneous source separation such as random dithering encoding can also be used to exactly or nearly exactly separate the response from different sources (Andersson et al., 2017). The region of exact or nearly exact separation will be smaller than the case of signal apparition. However, in a region in the frequency wavenumber space the number of unknowns is smaller than the number of equations under the assumption that the signal belongs in cones bounded by the velocity of the recording medium resulting in the ability to exactly or nearly exactly separate source contributions in a simultaneous source experiment below a certain frequency also in the case of randomly dithered sources.

BRIEF SUMMARY OF THE INVENTION

Methods for increasing the frequency range for exact or nearly exact separation of individual contributions from sources recorded in a simultaneous source seismic experiment, including (but not necessarily) by means of the signal apparition approach mentioned above or a conventional method for simultaneous source separation such as methods based on random dithering substantially as shown in and/or described in connection with at least one of the figures, and as set forth more completely in the claims.

Advantages, aspects and novel features of the present invention, as well as details of an illustrated embodiment thereof, may be more fully understood from the following description and drawings.

BRIEF DESCRIPTION OF THE DRAWINGS

In the following description reference is made to the attached figures, in which.

DETAILED DESCRIPTION

Figure 1:
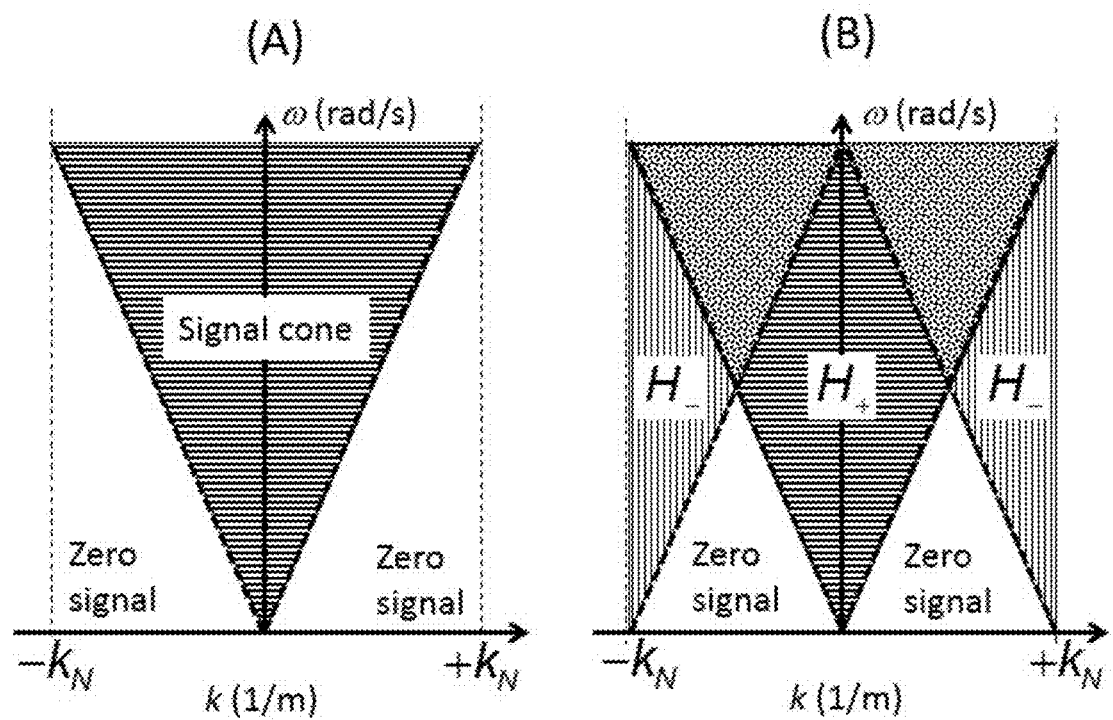
FIG. 1, parts (A) and (B) illustrate how in a conventional marine seismic survey along a single shot line all signal energy of sources typically sits inside a "signal cone" bounded by the propagation velocity of the recording medium and how this energy can be split in a transform domain by applying a modulation to a second source.

The following examples may be better understood using a theoretical overview as presented below.

It is herein proposed to use acquisition patterns in a plane instead of just a line to reduce ambiguity in the overlapping region thereby causing the area of exact or nearly exact separation to be larger.

By a plane it is meant a portion of the (infinite) horizontal plane covering an area corresponding to the length of the shotlines and the length in the crossline direction occupied by adjacent shotlines. Note that the number of sampling locations in the inline and crossline directions will limit the resolution properties of the Fourier transform. In practice the number of points should be greater than or equal to 8 or more. Specifically, for a Bravais lattice $(x_1,x_2)=(u_{1,1}k_1+u_{1,2}k_2, u_{2,1}k_1+u_{2,2}k_2)$ thus including rectangular sampling, staggered grid and hexagonal sampling, $K_1^{min} \leq k_1 < K_1^{max}$, $K_2^{min} \leq k_2 < K_2^{max}$, it should hold that $K_1^{max} - K_1^{min} \geq 8$ and $K_2^{max} - K_2^{min} \geq 8$.

Method for separating wavefields in the overlapping region includes utilizing the analytic part or the quaternion analytic part of the wavefields. In the following we describe the procedures in one spatial coordinate although it generalizes to two coordinates or more. We will use the notation $$\hat{f}(\xi) = \int_{-\infty}^{\infty} f(x)e^{-2\pi i x \xi} dx$$

for the Fourier transform.

Let $\mathcal{C}$ denote the cone $\mathcal{C} = \{(\omega,\xi): |\omega| > |\xi|\}$, and let $\mathcal{D}$ denote the non-aliased (diamond shaped) set $\mathcal{D} = \mathcal{C} \setminus (\{(\omega,\xi): |\omega| > |\xi - \frac{1}{2}|\} \cup \{(\omega,\xi): |\omega| > |\xi + \frac{1}{2}|\})$.

Suppose that $$d(t,j) = f_1(t,j) + f_2(t - \Delta_t(-1)^j, j) \tag{1}$$

is a known discrete sampling in x=j recorded at a first sampling interval. Note that due to this type of apparition sampling, the data d will always have aliasing effects present if the data is band unlimited in the temporal frequency direction.

If $f_1$ and $f_2$ represent seismic data recorded at a certain depth, it will hold that $\text{supp}(\widehat{f_1}) \subset \mathcal{C}$ and $\text{supp}(\widehat{f_2}) \subset \mathcal{C}$. We will assume that the source locations of $f_1$ and $f_2$ are relatively close to each other. Let $$D_1(\omega, \xi) = \int_{-\infty}^{\infty} \sum_{j=-\infty}^{\infty} d(t, j) e^{-2\pi i (j\xi + t\omega)} dt \text{ and}$$

$$D_2(\omega, \xi) = \int_{-\infty}^{\infty} \sum_{j} d(t + \Delta_t(-1)^j, j) e^{-2\pi i (j\zeta + t\omega)} dt.$$

It is shown in Andersson et al. (2016) that $$D_1(\omega, \zeta) = \tag{2}$$

$$\Sigma_{k=-\infty}^{\infty} \widehat{f_1}(\omega, \xi + k) + \Sigma_{k=-\infty}^{\infty} \widehat{f_2}\left(\omega, \xi + \frac{k}{2}\right)\frac{1}{2}(e^{-2\pi i \Delta_t \omega} + (-1)^k e^{2\pi i \Delta_t \omega}).$$

For each pair of values $(\omega,\xi) \in \mathcal{D}$, most of the terms over k in (2) vanish (and similarly for $D_2$), which implies that $\widehat{f_1}(\omega,\xi)$ and $\widehat{f_2}(\omega,\xi)$ can be recovered through $$\widehat{f_1}(\omega, \xi) = \frac{D_1(\omega, \xi) - \cos(2\pi\Delta_t\omega)D_2(\omega, \xi)}{\sin^2(2\pi\Delta_t\omega)}, \tag{3}$$

$$\widehat{f_2}(\omega, \xi) = \frac{D_2(\omega, \xi) - \cos(2\pi\Delta_t\omega)D_1(\omega, \xi)}{\sin^2(2\pi\Delta_t\omega)},$$

given that $\sin(2\pi\Delta_t\omega) \neq 0$.

By including an amplitude variation in (1), the last condition can be removed. For values of $(\omega,\xi) \notin \mathcal{C} \setminus \mathcal{D}$ it is not possible to determine the values of $\widehat{f_1}(\omega,\xi)$ and $\widehat{f_2}(\omega,\xi)$ without imposing further conditions on the data.

Given a real valued function $f$ with zero average, let $$f^a(t) = 2\int_0^\infty \int_{-\infty}^\infty f(t')e^{2\pi i (t-t')\omega} dt' d\omega.$$

The quantity is often referred to as the analytic part of $f$, a description that is natural when considering Fourier series expansions in the same fashion and comparing these to power series expansions of holomorphic functions. It is readily verified that $\text{Re}(f^a) = f$.

As an illustrative example, consider the case where $$f(t) = \cos(2\pi t)$$

for which it holds that $$f^a(t) = e^{2\pi i t}.$$

Now, whereas $|f(t)|$ is oscillating, $|f^a(t)| = 1$, i.e., it has constant amplitude. In terms of aliasing, it can often be the case that a sampled version of $=f^a|$ exhibits no aliasing even if $f$ and $|f|$ do so.

Let us now turn our focus back to the problem of recovering $\widehat{f_1}(\omega,\xi)$ and $\widehat{f_1}(\omega,\xi)$ for $(\omega,\xi)\notin \mathcal{D}$. We note that due to linearity, it holds that $$d^a(t,j) = f_1^a(t,j) + f_2^a(t - \Delta_t(-1)^j, j).$$

A natural condition to impose is that the local directionality is preserved through the frequency range. The simplest such case is when $f_1$ and $f_2$ are plane waves (with the same direction), i.e, when $$f_1(t,x) = h_1(t+bx), \text{ and } f_2(t,x) = h_2(t+bx).$$

Without loss of generality, we assume that $b>0$. We note that $$\hat{f}_1(\omega, \xi) = \int_{-\infty}^{\infty}\int_{-\infty}^{\infty} h_1(t+bx) e^{-2\pi i(t\omega + x\zeta)} dt dx$$
$$= \{s = t + bx\}$$
$$= \int_{-\infty}^{\infty}\int_{-\infty}^{\infty} h_1(s) e^{-2\pi i(s\omega + x(\xi - b\omega))} ds dx$$
$$= \overline{h_1}(\omega)\delta(\xi - b\omega).$$

A similar formula holds for $\widehat{f_2}$.

Let us now assume that $\omega<\frac{1}{2}$. Inspecting (2) we see that if, e.g., $-\frac{1}{2}<\xi<0$ then all but three terms disappear and therefore the blended data satisfies $$\widehat{d^a}(\omega,\xi) = (\overline{h_1^a}(\omega) + \cos(2\pi\Delta_t\omega)\overline{h_2^a}(\omega))\delta(\xi - b\omega) -$$
$$i\sin(2\pi\Delta_t\omega)\overline{h_2^a}(\omega)\delta(\xi - (b\omega - 1/2))$$
$$= \overline{h_1}(\omega)\delta(\xi - b\omega) + \overline{h_2}(\omega)\delta(\xi - (b\omega - 1/2)).$$

Let $w_h$, and $w_l$ be two filters (acting on the time variable) such that $w_h$ has unit $L^2$ norm, and such that $w_h$ has a central frequency of $\omega_0$ and $w_l$ has a central frequency of $\omega_0/2$. For the sake of transparency let $w_h = w_l^2$. Suppose that we have knowledge of $\widehat{f_1}(\omega,\xi)$ and $\widehat{f_2}(\omega,\xi)$ for $\omega<\omega_0$, and that the bandwidth of $w_l$ is smaller than $\omega_0/2$.

Let $g_1 = f_1^a * w_l$ and $g_2 = f_2^a * w_l$. Note that, e.g., $$g_1(t,x) = h_1^a * w_l(t+bx),$$

so that $g_1$ is a plane wave with the same direction as $f_1$. Moreover, $|g_1|$ will typically be mildly oscillating even when $f_1$ and $|f_1|$ are oscillating rapidly.

Let $$p_1 = \frac{g_1}{|g_1|}$$

be the phase function associated with $g_1$, and define $p_2$ in a likewise manner as phase function for $g_2$. If $w_l$ is narrowbanded, $g_1$ will essentially only contain oscillations of the form $$\overline{h_1}\left(\frac{\omega_0}{2}\right) e^{2\pi i \frac{\omega_0}{2}(t+bx)}$$

i.e., $|g_1(t,x)|$ is more or less constant.

Under the narrowband assumption on $w_l$ (and the relation $w_h = w_l^2$), we consider $$d_h(t,x) = (d^a * w_h)(t,x) \approx \overline{h_1}(\omega_0) e^{2\pi i \omega_0(t+bx)} +$$
$$\overline{h_2}(\omega_0) e^{2\pi i(\omega_0 t + (b\omega_0 - 1)x)}.$$

By multiplication by $\overline{p_1 p_2}$, which may be considered as an example of a conjugated phase factor, we get $$d_h(t,x) = \overline{p_1(t,x)p_2(t,x)} \approx \overline{h_1}(\omega_0) + \overline{h_2}(\omega_0) e^{-\pi i x}. \quad (4)$$

In the Fourier domain, this amounts to two delta-functions; one centered at the origin and one centered at $(0,-\frac{1}{2})$. Here, we may identify the contribution that comes from $f_2$ by inspecting the coefficient in front of the delta-function centered at $(0,-\frac{1}{2})$. By the aid of the low-frequency reconstructions $g_1$ and $g_2$, it is thus possible to move the energy that originates from the two sources so that one part is moved to the center, and one part is moved to the Nyquist wavenumber. Note that it is critical to use the analytic part of the data to obtain this result. If the contributions from the two parts can be isolated from each other, it allows for a recovery of the two parts in the same fashion as in (3). Moreover, as the data in the isolated central centers is comparatively oversampled, a reconstruction can be obtained at a higher resolution than the original data. Afterwards, the effect of the phase factor can easily be reversed, and hence a reconstruction at a finer sampling, i.e. at a smaller sampling interval than the original can be obtained.

A similar argument will hold in the case when the filters $w_l$ and $w_h$ have broader bandwidth. By making the approximation that $$p_1(t,x) \approx e^{\pi i \omega_0(t+bx)}$$

we get that $$d_h(t,x) = \overline{p_1(t,x)p_2(t,x)} \approx \overline{h_1}(\omega) e^{2\pi i(\omega - \omega_0)(t+bx)} +$$
$$\overline{h_2}(\omega) e^{-\pi i x + e^{-\pi i(\omega - \omega_0)(t+bx)}},$$

and since $w_h$ is a bandpass filter, $\widehat{d_h}(\omega,\xi)$ will contain information around the same two energy centers, where the center around $(0,-\frac{1}{2})$ will contain only information about $f_2$. By suppressing such localized energy, we can therefore extract only the contribution from $f_2$ and likewise for $f_1$.

The above procedure can now be repeated with $\omega_0$ replaced by $\omega_1 = \beta\omega_0$ for some $\beta>1$. In this fashion we can gradually recover (dealias) more of the data by stepping up in frequency. We can also treat more general cases. As a first improvement, we replace the plane wave assumption by a locally plane wave assumption, i.e., let $\varphi_\alpha$ be a partition of unity ($\Sigma_\alpha \varphi_\alpha^2 = 1$), and assume that $$f_1(t,x)\varphi_\alpha^2(t,x) \approx h_{1,\alpha}(t+b_\alpha x)\varphi_\alpha^2(t,x).$$

In this case the phase functions will also be locally plane waves, and since they are applied multiplicatively on the space-time side, the effect of (4) will still be that energy will be injected in the frequency domain towards the two centers at the origin and the Nyquist wavenumber.

Now, in places where the locally plane wave assumption does not hold, the above procedure will not work. This is because as the phase function contains contributions from several directions at the same location, the effect of the multiplication in will no longer correspond to injecting the energy of $D_1$ (and $D_2$) towards the two centers around the origin and the Nyquist number. However, some of this directional ambiguity can still be resolved.

In fact, upon inspection of (2), it is clear that the energy contributions to a region with center $(\omega_0, \xi_0)$ must originate from regions with centers at $(\omega_0, \xi_0 + k/2)$ for some k. Hence, the directional ambiguity is locally limited to contributions from certain directions. We will now construct a setup with filters that will make use of this fact.

Let us consider the problem where we would like to recover the information from a certain region $(\omega_0, \xi_0)$. Due to the assumption that $f_1$ and $f_2$ correspond to measurements that take place close to each other, we assume that $f_1$ and $f_2$ have similar local directionality structure. From (2) we know that energy centered at $(\omega_0, \xi_0)$ will be visible in measurements $D_1$ at locations $(\omega_0, \xi_0 + k/2)$. We therefor construct a (space-time) filter $w_h$, that satisfies $$\widehat{w_h}(\omega, \xi) = \Sigma_k \hat{\Psi}\left(\omega - \omega_0, \xi - \xi_0 - \frac{k}{2}\right). \quad (5)$$

We now want to follow a similar construction for the filter $w_l$. Assuming that there is locally only a contribution from a direction associated with one of the terms over k above, we want the action of multiplying with the square of the local phase to correspond to a filtration using the part of $w_h$ that corresponds to that particular k.
This is accomplished by letting $$\widehat{w_l}(\omega, \xi) = \Sigma_k \hat{\Psi}\left(\omega - \frac{\omega_0}{2}, \xi - \frac{\xi_0}{2} - \frac{k}{4}\right), \quad (6)$$

where $\hat{\Psi} = \hat{\psi} * \hat{\psi}$.

Under the assumption that $f_1 * w_h$ and $f_2 * w_l$ has a local plane wave structure, we may now follow the above procedure to recover these parts of $f_1$ and $f_2$ (by suppressing localized energy as described above). We may then completely recover $f_1$ and $f_2$ up to the temporal frequency $\omega_0$ by combining several such reconstructions, and hence we may proceed by making gradual reconstructions in the $\omega$ variable as before.

Let $\mathbb{H}$ be the quaternion algebra (Hamilton, 1844). An element $g \in \mathbb{H}$ can be represented as $q = q_0 + iq_1 + jq_2 + kq_3$, where the $q_j$ are real numbers and $i^2 = j^2 = k^2 = ijk = 1$. We also recall Euler's formula, valid for i,j,k:

$e^{i\theta} = \cos\theta + i\sin\theta, e^{j\theta} = \cos\theta + j\sin\theta, e^{k\theta} = \cos\theta + k\sin\theta$.

Note that although i,j,k commute with the reals, quaternions do not commute in general. For example, we generally have $e^{i\theta}e^{j\phi} \neq e^{j\phi}e^{i\theta}$ which can easily be seen by using Euler's formula. Also recall that the conjugate of $q = q_0 + iq_1 + jq_2 + kq_3$ is the element $q^* = q_0 - iq_1 - jq_2 - kq_3$. The norm of q is defined as $\|q\| = (qq^*)^{1/2} = (q_0^2 + q_1^2 + q_2^2 + q_3^2)^{1/2}$.

Given a real valued function $f = f(t,x)$, we define the quaternion Fourier transform (QFT) of $f$ by $$\mathcal{Q} f(\omega, \xi) = \int_{-\infty}^{\infty} \int_{-\infty}^{\infty} e^{-2\pi i t \omega} f(t,x) e^{-2\pi j x \xi} dt dx.$$

Its inverse is given by $$f(t,x) = \mathcal{Q}^{-1}(\mathcal{Q} f)(t,x) = \int_{-\infty}^{\infty} \int_{-\infty}^{\infty} e^{-2\pi i t \omega} \mathcal{Q} f(\omega, \xi) e^{2\pi j x \xi} d\omega d\xi.$$

In a similar fashion, it is possible to extend the Fourier transform to other hypercomplex representations, e.g., octanions (van der Blij, 1961), sedenions (Smith, 1995) or other Cayley or Clifford algebras. A similar argument applies to other well-known transform domains (e.g., Radon, Gabor, curvelet, etc.).

Let $$\chi(\omega, \xi) = \begin{cases} 4 & \text{if } \omega > 0 \text{ and } \xi > 0, \\ 0 & \text{otherwise.} \end{cases}$$

Using $\chi$ we define $f^q : \mathbb{R}^2 \to \mathbb{H}$ as $$f^q = \mathcal{Q}^{-1} \chi \mathcal{Q} f.$$

We call $f^q$ the quaternion part of $f$. This quantity can be seen as a generalization of the concept of analytic part. For the analytic part, half of the spectrum is redundant. For the case of quaternions, three quarters of the data is redundant.

In a similar fashion, it is possible to extend the analytic part to other hypercomplex representations, e.g., octanions (van der Blij, 1961), sedenions (Smith, 1995) or other Cayley or Clifford algebras.

The following results will prove to be important: Let $f(t,x) = \cos u$, where $u = 2\pi(at + bx) + c$ with $a > 0$. If $b > 0$ then $f^q(t,x) = \cos u + i \sin u + j \sin u - k \cos u$, and if $b < 0$ then $f^q(t,x) = \cos u + i \sin u - j \sin u + k \cos u$.

The result is straightforward to derive using the quaternion counterpart of Euler's formula. Note that whereas $|f(t,x)|$ is oscillating, $\|f^q\| = \sqrt{2}$, i.e., it has constant amplitude. In terms of aliasing, it can often be the case that a sampled version of $\|f^q\|$ exhibits no aliasing even if $f$ and $|f|$ do so.

Assume that $f(t,x) = \cos(u)$, and that $g(t,x) = \cos(v)$, where $u = 2\pi(a_1 t + b_1 x) + e_1$ and $v = 2\pi(a_2 t + b_2 x) + e_2$ with $a_1, a_2 \geq 0$. It then holds that $$\overline{g^q} f^q \overline{g^q} = \begin{cases} 2(\cos(u - 2v)(1 + k) + \sin(u - 2v)(i + j)) & \text{if } b_1, b_2 \geq 0, \\ 2(\cos(u)(-1 - k) + \sin(u)(i + j)) & \text{if } b_1 \geq 0 \text{ and } b_2 < 0, \end{cases}$$

with similar expressions if $b_1 < 0$.

Let us describe how to recover $\widehat{f_1}(\omega, \xi)$ and $\widehat{f_2}(\omega, \xi)$ us the quaternion part. We will follow the same procedure as before, and hence it suffices to consider the case where $f_1 = h_1(t + bx)$, $f_2 = h_2(t + bx)$, with $b > 0$, and $\omega < \frac{1}{2}$. Let $w_h$ and $w_l$ be two (real-valued) narrowband filters with central frequencies of $\omega_0$ and $\omega_0/2$, respectively, as before. From (2), it now follows that $d * w_h(t,x) \approx c_1 \cos(2\pi\omega_0(t+bx)+e_1) + c_2 \cos(2\pi\omega_0(t+bx)+e_2)$, for some coefficients $c_1, c_2$, and phases $e_1, e_2$, and with $b < 0$.

Since $f_1$ and $f_2$ are known for $\omega = \omega_0/2$, we let $g_1(t,x) = f_1 * w_l(t,x) \approx c_3 \cos(\pi\omega_0(t+bx)+e_3)$.

We compute the quaternion part $g_1^q$ of $g_1$, and construct the phase function associated with it as $$p_1 = \frac{g_1^q}{|g_1^q|},$$

and define $p_2$ in a likewise manner as the phase function for $g_2$.

Let $d^q$ be the quaternion part of $d*w_h$. It then holds that after a left and right multiplication of conjugate of the phase factors $p_1$ and $p_2$ $$\overline{p_1} d^q \overline{p_1} \approx c_1 2(\cos(e_1 - 2e_3)(1+k) + \sin(e_1 - 2e_3)(i+j)) + \\ c_2 2(\cos(2\pi\omega_0(t + \bar{b}x) + e_1)(-1-k) + \sin(2\pi\omega_0(t + \bar{b}x) + e_1)(i+j)).$$

This result is remarkable, since the unaliased part of d is moved to the center, while the aliased part remains intact. Hence, it allows for a distinct separation between the two contributing parts.

It is herein proposed to increase the maximum frequency for fully recovering the contributions in recorded a wavefield from individual sources in a simultaneous source survey. More precisely, this is achieved by considering sampling the same wavefield along a plurality of parallel sail-lines to unambiguously delineate regions of overlap in a Fourier-wavenumber plane of at least two spatial dimensions.

Let us begin by introducing notation and recapitulating the theory for regular seismic apparition. We will use the notation $$\hat{f}(\xi) = \int_{-\infty}^{\infty} f(x) e^{-2\pi i x \xi} dx$$

for the Fourier transform in one variable, and consequently $\hat{f}(\omega, \xi_1, \xi_2)$ for the Fourier transform of two dimensional function $f(t, x_1, x_2)$ with a time (t) and spatial $(x_1, x_2)$ dependence. When referring to Fourier transforms with respect to only part of the variables we will use the ^ notation and use the variable names to implicitly specify with regards to which dimensions the transform is applied.

Suppose that $f(t, x_1, x_2)$ is a function with frequency support in two cones of the form $$\frac{\omega^2}{c^2} \geq (\xi_1^2 + \xi_2).$$

The constraint comes from assuming that the function $f$ represent the recording of a wavefield at time t at a fixed receiver coordinate, source coordinates $(x_1, x_2)$, and fixed depth, where the recorded wave field at this depth is a solution to the homogeneous wave equation with a velocity c. The wavefields are generated at discrete values of $(x_1, x_2)$ which we assume to be equally spaced with sampling distances $\Delta_{x_1}$ and $\Delta_{x_2}$ meters. For the sake of transparency we will assume the two spacing coordinates to be equal with a distance set to 1 in the presentation that follows, i.e. $\Delta_{x_1} = \Delta_{x_2} = 1$. The derived expressions hold in a more general setting, and it is fairly straightforward to incorporaty kind of Bravais sampling lattice $(x_1, x_2) = (u_{1,1} k_1 + u_{1,2} k_2, u_{2,1} k_1 + u_{2,2} k_2)$, thus including rectangular sampling, staggered grid and hexagonal sampling.

We now consider the case where several sources are used simultaneously. In this presentation we assume that the M sources are aligned sequentially, although the theory can easily be adjusted to cover more general sampling formations. Moreover, in this presentation, we will assume that the different sources are fired with a small internal time delays, that vary with period M. This variation can be of more general form, for instance varying with a delay pattern that includes a heteroscale variation (several superimposed or products of periodic or non-periodic functions), random or quasi-random time delay patterns or variations in source amplitude for instance. Let us denote the periodic delay pattern by $\Delta_{m_1, m_2}$. One formulation for the representation described above is $$d(t, Mk_1 + m_1, k_2) = \sum_{m_2=1}^{M} f(t - \Delta_{m_1, m_2}, (Mk_1 + m_1)\Delta_x, (Mk_2 + m_2)\Delta_x) = \\ \sum_{m_2=1}^{M} \mathcal{F}^*(\hat{f}(\omega, \xi_1, \xi_2) e^{-2\pi i \Delta_{m_1, m_2} \omega})(t, (Mk_1 + m_1)\Delta_x, (Mk_2 + m_2)\Delta_x),$$

The Poisson sum formula $$\Sigma_{k=-\infty}^{\infty} f(k) = \Sigma_{k=-\infty}^{\infty} \hat{f}(k)$$

can be modified (by using the Fourier modulation rule) as $$\sum_{k=-\infty}^{\infty} f(k) e^{-2\pi i \xi k} = \sum_{k=-\infty}^{\infty} \mathcal{F}(f(\cdot) e^{-2\pi i \xi \cdot})(k) = \sum_{k=-\infty}^{\infty} \hat{f}(\xi + k).$$

By the standard properties of the Fourier transform it is straightforward to show that $$\sum_{k=-\infty}^{\infty} f(k\Delta_x + x_0) e^{-2\pi i (k\Delta_x + x_0)\xi} = \frac{1}{\Delta_x} \sum_{k=-\infty}^{\infty} \hat{f}\left(\xi + \frac{k}{\Delta_x}\right) e^{2\pi i x_0 \frac{k}{\Delta_x}}$$

hold for the spatial sampling parameter $\Delta_x$ and some fixed spatial shift $x_0$.

Let us now consider Fourier representation of the data. We can assume that the sampling in time is fine enough to use the continuous Fourier transform for the temporal part. For the spatial parts, we will expand the data by means of Fourier series representation, thus obtained a representation that is periodic with respect to the continuous frequency-wavenumber parameters $\xi_1$ and $\xi_2$.

The transform thus takes the shape $$D(\omega, \xi_1, \xi_2) = \int_{-\infty}^{\infty} \sum_{k_1=-\infty}^{\infty} \sum_{k_2=-\infty}^{\infty} d(t, k_1, k_2) e^{-2\pi i (k_1 \xi_1 + k_2 \xi_2 M) + t\omega)} dt = \\ \int_{-\infty}^{\infty} \sum_{m_1=1}^{M} \sum_{k_1=-\infty}^{\infty} \sum_{k_2=-\infty}^{\infty} d(t, Mk_1 + m_1, k_2) e^{-2\pi i ((Mk_1 + m_1)\xi_1 + Mk_2 \xi_2 + t\omega)} dt = \\ \int_{-\infty}^{\infty} \sum_{m_1=1}^{M} \sum_{m_2=1}^{M} \sum_{k_1=-\infty}^{\infty} \sum_{k_2=-\infty}^{\infty} f(t, Mk_1 + m_1, Mk_2 + m_2) \times \\ e^{-2\pi i ((Mk_1 + m_1)\xi_1 + (Mk_2)\xi_2 + t\omega + \Delta_{m_1, m_2}\omega)} dt$$

By taking a one-dimensional Fourier transform with respect to the time variable it holds that $$D(\omega, \xi_1, \xi_2) = \sum_{m_1=1}^{M} \sum_{m_2=1}^{M} \sum_{k_1=-\infty}^{\infty} \sum_{k_2=-\infty}^{\infty} \hat{f}(\omega, Mk_1 + m_1, Mk_2 + m_2) \times \\ e^{-2\pi i ((Mk_1 + m_1)\xi_1 + (Mk_2)\xi_2 + \Delta_{m_1 m_2}\omega)}$$

Let us now focus on the part $$\Sigma_{k_1=-\infty}^{\infty} \hat{f}(\omega, Mk_1 + m_1, Mk_2 + m_2) e^{-2\pi i (Mk_1 + m_1)\xi_1}$$

By using the version of the Poisson sum formula above, we can rewrite the expression above as $$\sum_{k_1=-\infty}^{\infty} \hat{f}(\omega, Mk_1+m_1, Mk_2+m_2)e^{-2\pi i(Mk_1+m_1)\xi_1} =$$

$$\sum_{k_1=-\infty}^{\infty} \hat{f}\left(\omega, \xi_1+\frac{k_1}{M}, Mk_2+m_2\right)e^{2\pi i m_1 k_1/M}$$

Using a similar argument for the sum over $k_2$ we obtain $$\hat{h}(\omega, \xi_1, \xi_2) =$$

$$\sum_{k_1=-\infty}^{\infty}\sum_{k_2=-\infty}^{\infty} \hat{f}(\omega, Mk_1+m_1, Mk_2+m_2)e^{-2\pi i((Mk_1+m_1)\xi_1+(Mk_2+m_2)\xi_2)} =$$

$$\sum_{k_2=-\infty}^{\infty}\sum_{k_1=-\infty}^{\infty} \hat{f}\left(\omega, \xi_1+\frac{k_1}{M}, \xi_2+\frac{k_2}{M}\right)e^{2\pi i((m_1 k_1+m_2 k_2)/M+m_2\xi)}$$

It is now important to note that the periodicity of $\hat{h}$ with respect to $\xi_2$ is $(1/M)$ and not 1 as it is for the periodicity with respect to $\xi_1$. To see this, note that for any integer $k_2'$ it holds that $$\hat{h}(\omega, \xi_1, \xi_2+k_2'/M) =$$

$$\sum_{k_2=-\infty}^{\infty}\sum_{k_1=-\infty}^{\infty} \hat{f}\left(\omega, \xi_1+\frac{k_1}{M}, \xi_2+\frac{k_2+k_2'}{M}\right)e^{2\pi i((m_1 k_1+m_2 k_2)/M+m_2(\xi+k_2'))} =$$

$$\sum_{k_2=-\infty}^{\infty}\sum_{k_1=-\infty}^{\infty} \hat{f}\left(\omega, \xi_1+\frac{k_1}{M}, \xi_2+\frac{k_2+k_2'}{M}\right)e^{2\pi i((m_1 k_1+m_2(k_2+k_2'))/M+m_2\xi)} =$$

$$\hat{h}(\omega, \xi_1, \xi_2).$$

It now follows that $$D(\omega, \xi_1, \xi_2) = \sum_{m_1=1}^{M}\sum_{m_2=1}^{M} \hat{h}(\omega, \xi_1, \xi_2)e^{-2\pi i \Delta_{m_1 m_2}\omega}$$

will have period 1 in the $\xi_1$-direction and period $1/M$ in the $\xi_2$-direction. It is now possible to choose the time delays $\Delta_{m_1,m_2}$ such that the periodicity of D $(\omega,\xi_1,\xi_2)$ in the $\xi_1$ direction is larger than $1/M$ (where we in the definition of periodicity use a requirement of independence of $\hat{f}$, discarding degenerate cases such as $\hat{f}=0$), and typically such that the periodicity becomes 1 (using the normalized setup with $\Delta_x=1$ as mentioned earlier on).

Figure 2:
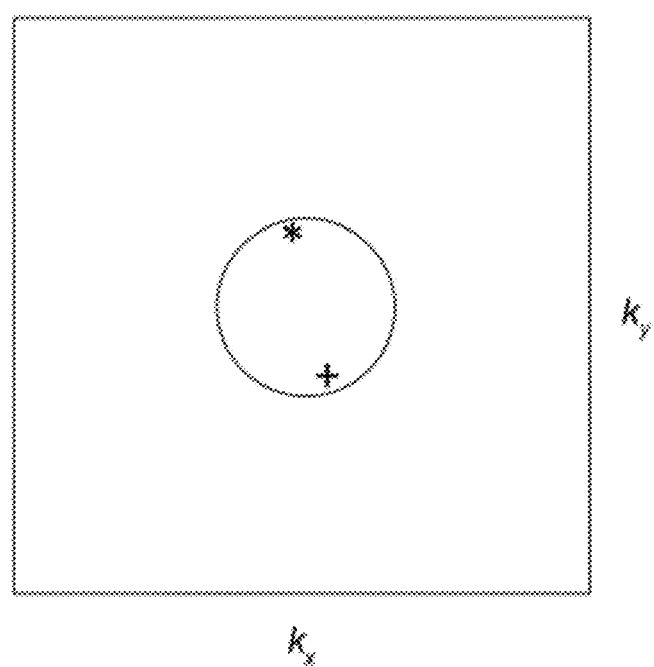
FIG. 2 shows an illustration of a frequency plane for a receiver gather with sources shot on a 2D (x,y)-grid. The example illustrates a well-sampled case without any aliasing or interference of contributions from different sources during simultaneous source acquisition. The "*" and the "+" mark two features of interest within the signal cone.
Figure 3:
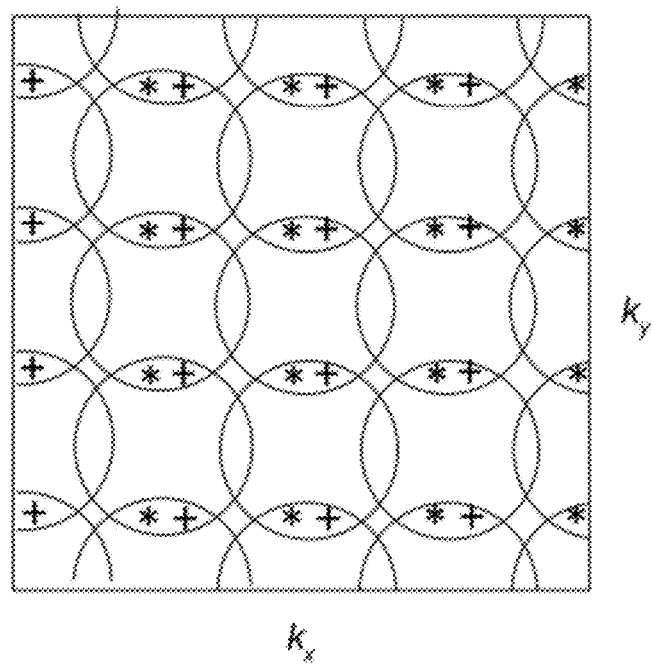
FIG. 3 shows an illustration of a frequency plane for a receiver gather with sources shot on a 2D (x,y)-grid. The example illustrates an under-sampled case where a single source was shot on a four times as sparse grid as that in FIG. 2, generating overlapping regions of replicated and shifted signal cones.
Figure 4:
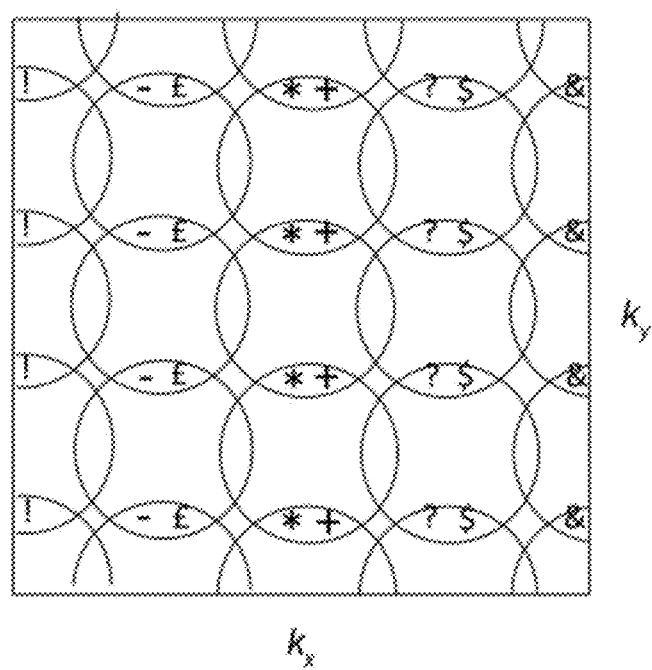
FIG. 4 shows an illustration of a frequency plane for a receiver gather with sources shot on a 2D (x,y)-grid. The example illustrates a case of under-sampling in the y-direction but where apparition encoding has been carried out in the x-direction.

Let us now consider what happens for fixed values of $\omega$. Since the support of $\hat{f}$ lies inside a cone whose width is determined by the spatial sampling parameters and the propagation medium velocity, it follows that the footprint of $\hat{f}(\omega,\xi_1,\xi_2)$ will be a disk in the $(\xi_1,\xi_2)$-plane. FIG. 2 illustrates such a disk with two particular features marked "*" and "+". From the derived expression above it follows that $D(\omega,\xi_1,\xi_2)$ consists of the union of several, possibly overlapping, such disks. Whereas the information that is recoverable in a regular sampling scheme would only be parts of disks that do not overlap (see FIG. 3 where the "*" and "+" features are reproduced identically in all overlapping regions), it is possible to recover information even when the disks are overlapping in the case illustrated in this application, because of the fact that there are several disks with different information content overlapping (see FIG. 4 where the "*" and "+" features are now not reproduced identically in the horizontal direction but reproduced identically in the vertical direction). This implies that it is possible to design a set of linear equation to recover information well beyond what would be feasible in a standard sampling setup. It also allows for trading sampling information in the different sampling directions.

Figure 5:
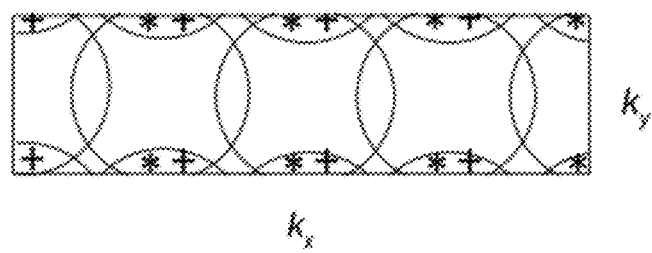
FIG. 5 shows a zoom in of the region of interest in FIG. 3, where we would like to remove overlap between cones.
Figure 6:
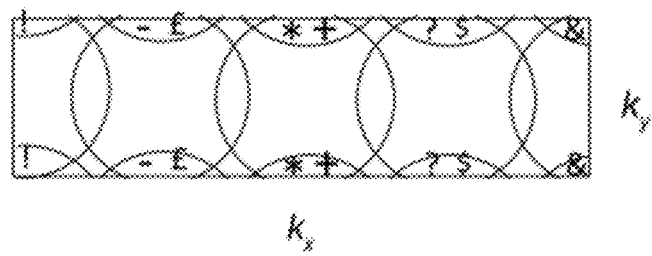
FIG. 6 shows a zoom in of the region of interest in FIG. 4, where we would like to remove overlap between cones.

FIG. 5 and FIG. 6, show the part of the data that is used to solve for delineating the overlapping parts. In the case of regular sampling this will not be possible since the overlapping parts are all identical (FIG. 5). However, in the case of applying the sampling strategy in the inline direction as described in the present invention we see that the overlapping parts are different such that it is possible to determine where the marked features in the overlapping domains belong, provided that we know how the data were sampled in the inline direction (e.g., what time delay pattern that was used for the simultaneous source acquisition). As described above, the sampling in the inline direction can for instance be carried out using time-delays that vary periodically or randomly for instance in the inline direction. The sampling does not need to be identical in the crossline direction (the case illustrated in FIG. 4 and FIG. 6). However, it will be important to know what time delays that were used along the parallel sail-lines.

One such scenario would be a vessel travelling along a sail-line, where it is possible to collect information along that line fairly densely. To collect information not only along single lines, the vessel will have to travel along several sail lines. To obtain a dense sampling, these sail lines would therefore have to be laid out close to each other, and this results in that the total measurement scenario takes a long time.

Instead, the vessel could carry sources spread out in the direction perpendicular to the sail line. By using the properties described above it is possible to obtain a sampling that provides full resolution up to a certain frequency $\omega_0$ where the overlapping of disk does not prohibit perfect recovery, at an (more) equally spaced sampling lattice than what is obtained by acquiring data along individual sail lines.

An important consideration for the acquisition of data that is rich in low frequencies is related to how we choose to encode the simultaneous sources relative other in for instance choosing the magnitude of the time shifts used for encoding and where the sources are located relative to each other in space.

In the following for simplicity we will discuss the case of two simultaneous sources. However, the same arguments generalizes in a straight forward way to a larger number of sources, for instance with time delays smaller than the time delay considered between the two sources in the following and/or spaced at distances within the two sources considered below.

The combined output of two sources at a certain frequency is $A=e^{i\omega t}+e^{i\omega(t+\Delta_t)}$, where $\Delta_t$ is the time shift between the activation time of the two sources and $\omega$ is the (angular) frequency of the emitted amplitude spectrum.

The interference manifests itself in an amplitude effect and a phase effect. Both are unraveled during the decoding. However, the level of the interference of the two sources is relevant when considering the signal-to-noise ratio in the acquired data.

For simplicity we consider an average time delay in activation time between the two sources of 50 ms. The simple equation for the combined output shows that frequencies below 6.7 Hz benefit from constructive interference between the two sources.

The spatial separation of the two sources is also important to achieve constructive interference. The phase shift between two sources that are separated by a small distance relative to the distance of propagation can be computed in a straight forward manner using Pythagoras theorem. If we simply consider a case where the distance of propagation is 5000 m in a medium with propagation velocity 1500 m/s (water), the phase shift between two sources spaced 750 m apart in a direction perpendicular to the plane of propagation is 37 ms. In such a case we will obtain constructive interference below 10 Hz. However, in the broadside direction the limit for constructive interference is lower as the phase shift becomes greater. Below 4 Hz we can expect constructive interference for all azimuths and emergence angles smaller than 15 degrees relative to the vertical which will enable the acquisition for instance of refracted arrivals for tomography and full waveform inversion propagating in the deeper part of the subsurface of interest.

EXAMPLE

A synthetic example was created using an acoustic 3D finite-difference synthetic data set mimicking a seabed seismic acquisition geometry over a complex sub surface model.

Figure 7:
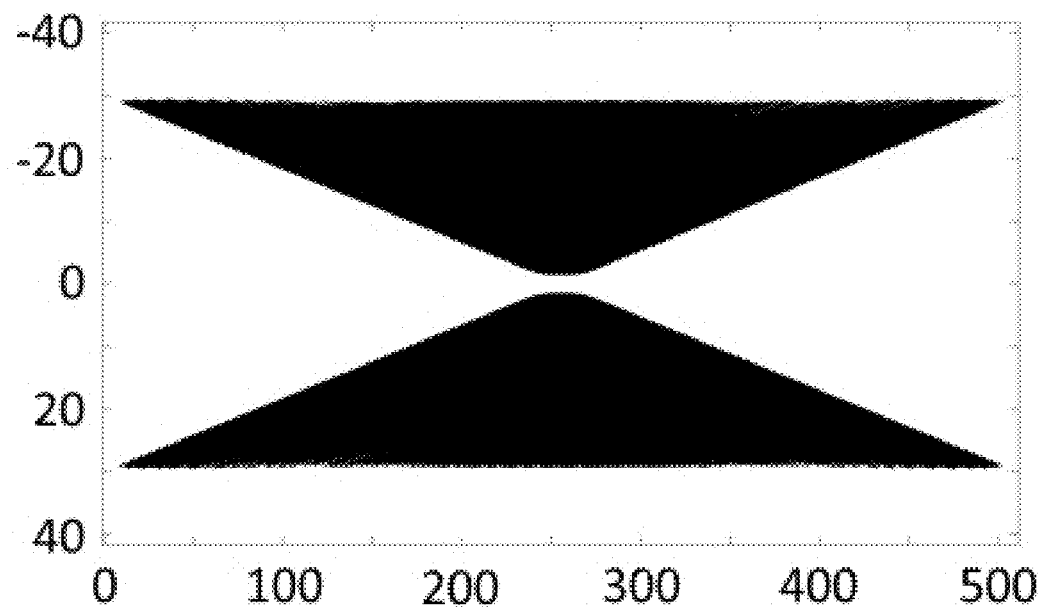
FIG. 7 shows the fk transform of the reference data in the data example along a line corresponding to a single shotline in a common receiver gather.

In the example a 25 m by 25 m shot grid was generated over a single seabed node receiver. The source had a spectrum up to 30 Hz. FIG. 7 shows the 2D Fourier transform (fk) over a line of shots in a single source acquisition mode. The data map inside a cone bounded by the water velocity.

Figure 8:
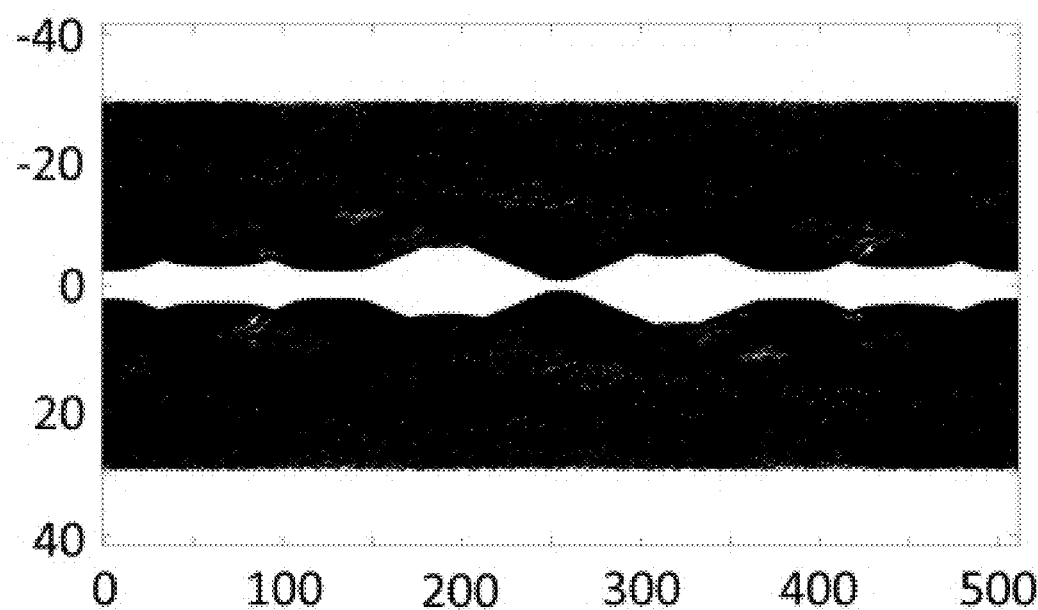
FIG. 8 shows the fk transform of 8 simultaneous sources in the data example along a line corresponding to a single shotline in a common receiver gather.

FIG. 8 shows the 2D Fourier transform (fk) over an 8 simultaneous source acquisition mode where 8 parallel shot lines were acquired simultaneously encoded using the method of signal apparition.

Figure 9:
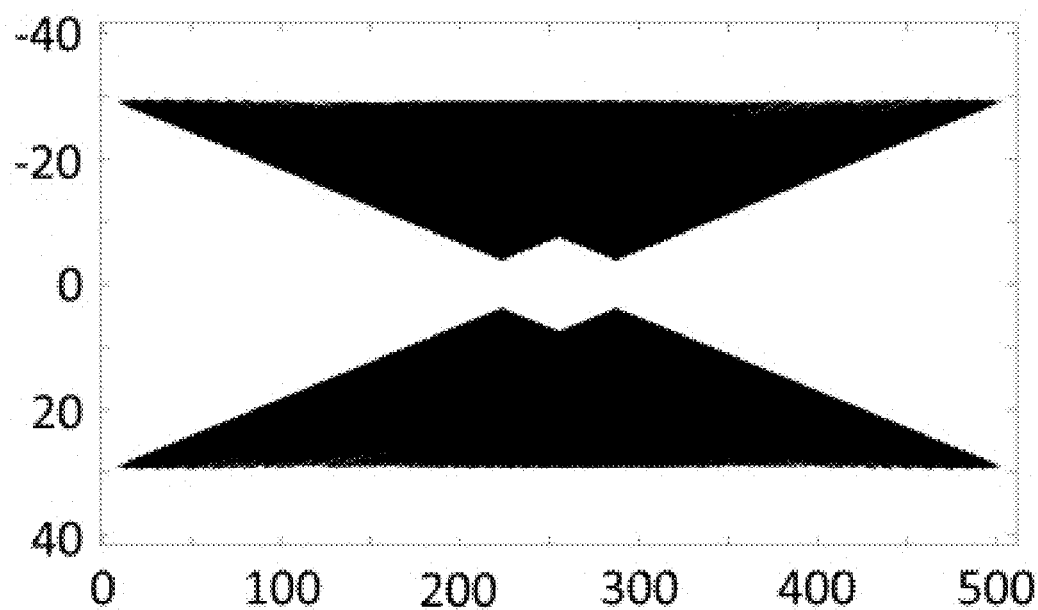
FIG. 9 shows the fk transform of the difference between the reference data in FIG. 7 and the data in FIG. 8 decoded by the method of signal apparition along a single line.

FIG. 9 shows the difference between the reference data in FIG. 7 and the decoded data corresponding to the same source line shown in FIG. 8 for the case where the decoding was carried out in a 2D mode along a single swath line of acquisition (using the 8 parallel simultaneously acquired shot lines only) as described in the prior art (e.g., Robertsson et al., 2016). The lozenge-shaped region where the decoding is exact (or nearly exact) is empty as expected and the error is very large outside this region. FIG. 9 confirms equations (0.3) and (0.4) resulting in a lozenge-shaped region with $f_{mid}=3.75$ Hz and $f_{top}=7.5$ Hz for this case with 8 sources.

Figure 10:
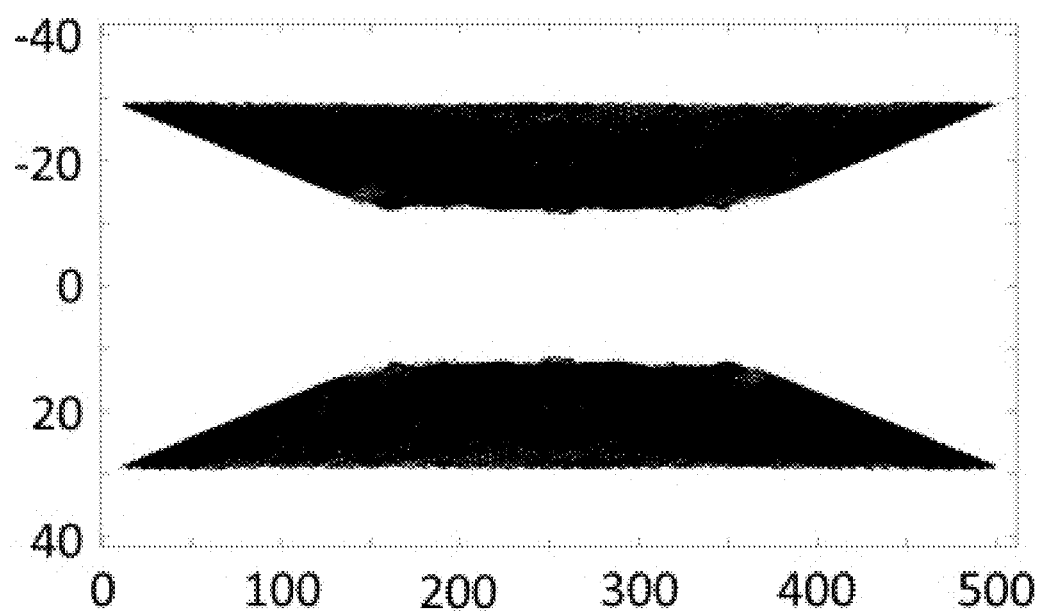
FIG. 10 shows the fk transform of the difference between the reference data in FIG. 7 and the data in FIG. 8 decoded by means of the method described in the present invention using source lines covering a 2D lateral plane.

FIG. 10 shows a similar difference plot as in FIG. 9 but this time using the method in the present invention where data from a large number of parallel swaths positioned in the 2D horizontal plane (3D acquisition mode) were used to decode the data from which one of the swaths is shown in FIG. 8. The region of highly accurate decoding is no longer lozenge-shaped but covers a full triangle resulting in exact (or nearly exact) decoding below a certain frequency which in this case is approximately 10.5 Hz.

Figure 11:
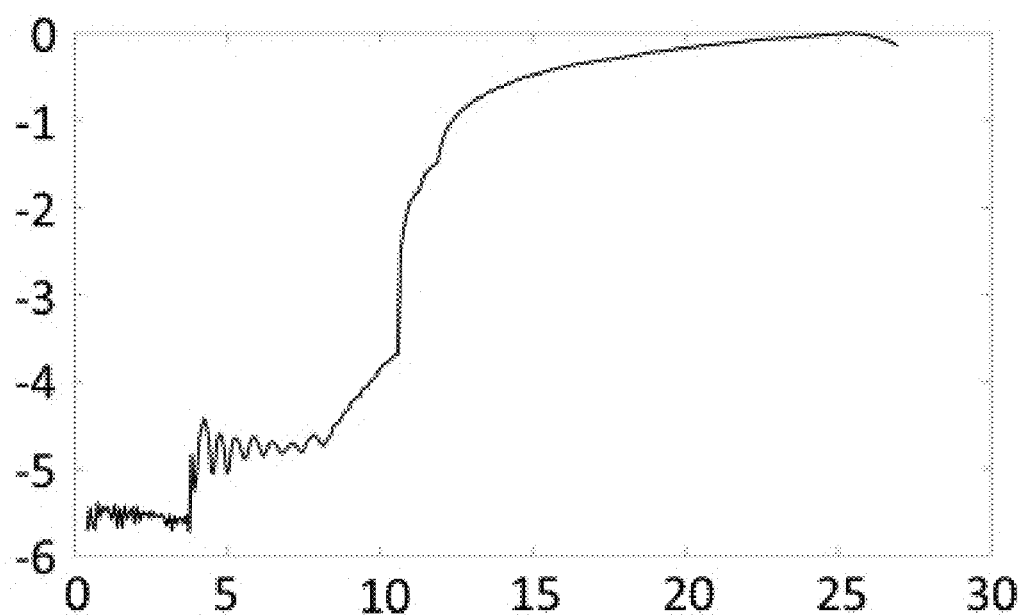
FIG. 11 shows a linlog plot of the cumulative error in FIG. 10 summed over all inline and crossline wavenumbers.
Figure 12:
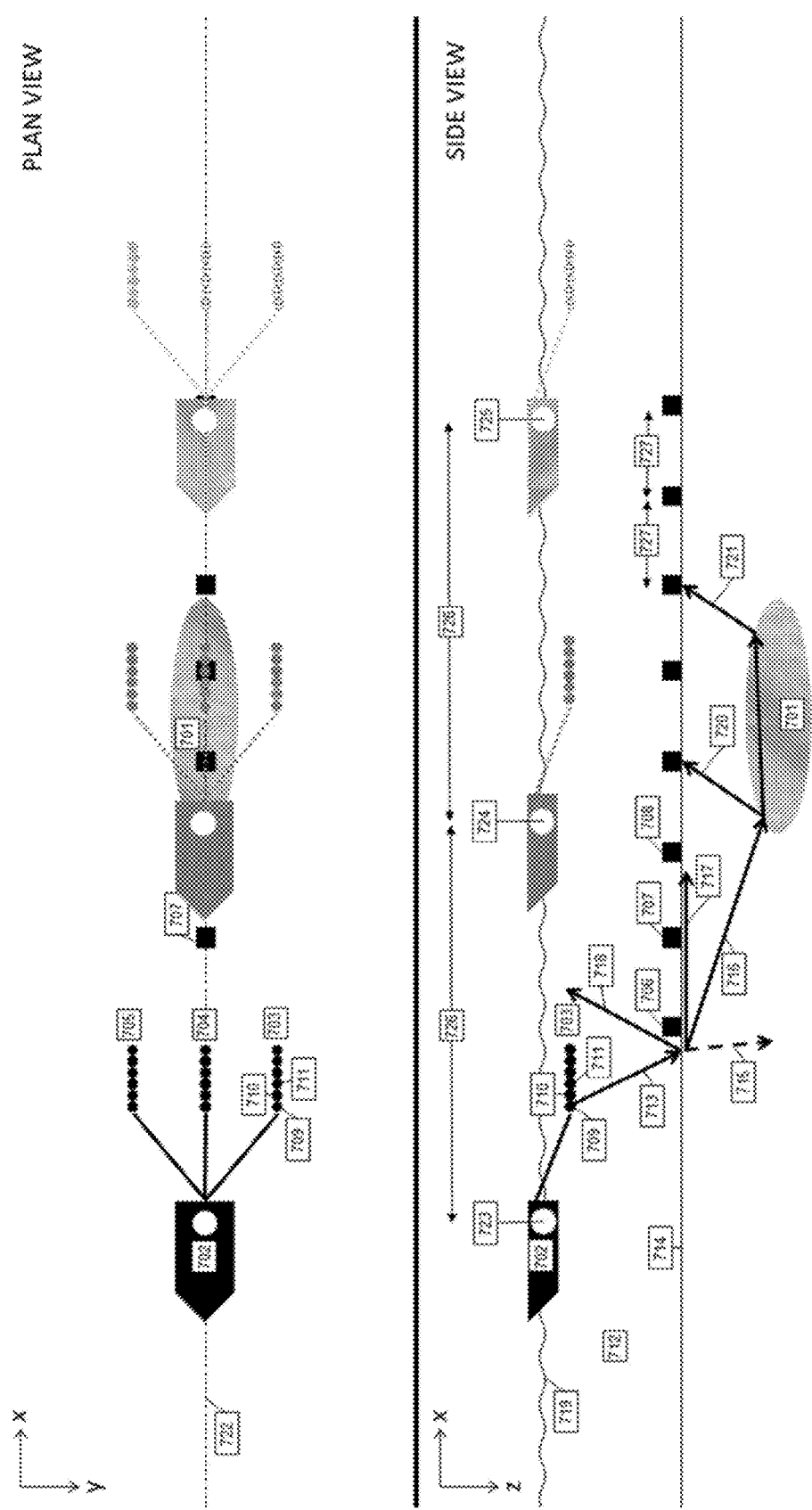
FIG. 12 Shows the general practice of marine seismic surveying.
Figure 13:
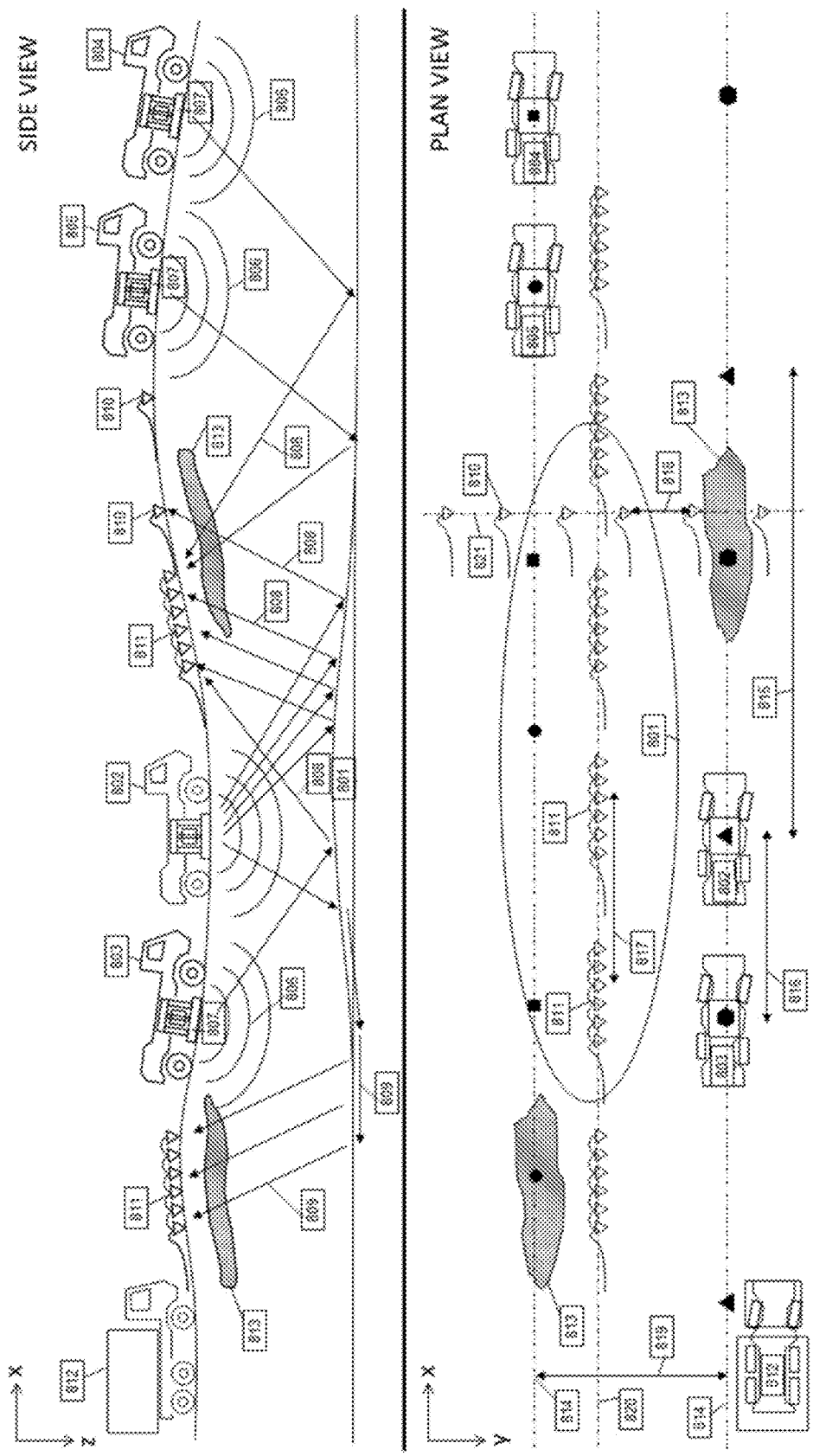
FIG. 13 Shows the general practice of land seismic surveying.

FIG. 11 shows a logarithmic plot of the cumulative error in FIG. 10 summed over all inline and crossline wavenumbers. The error is very low below 10.5 Hz.

Figure 14:
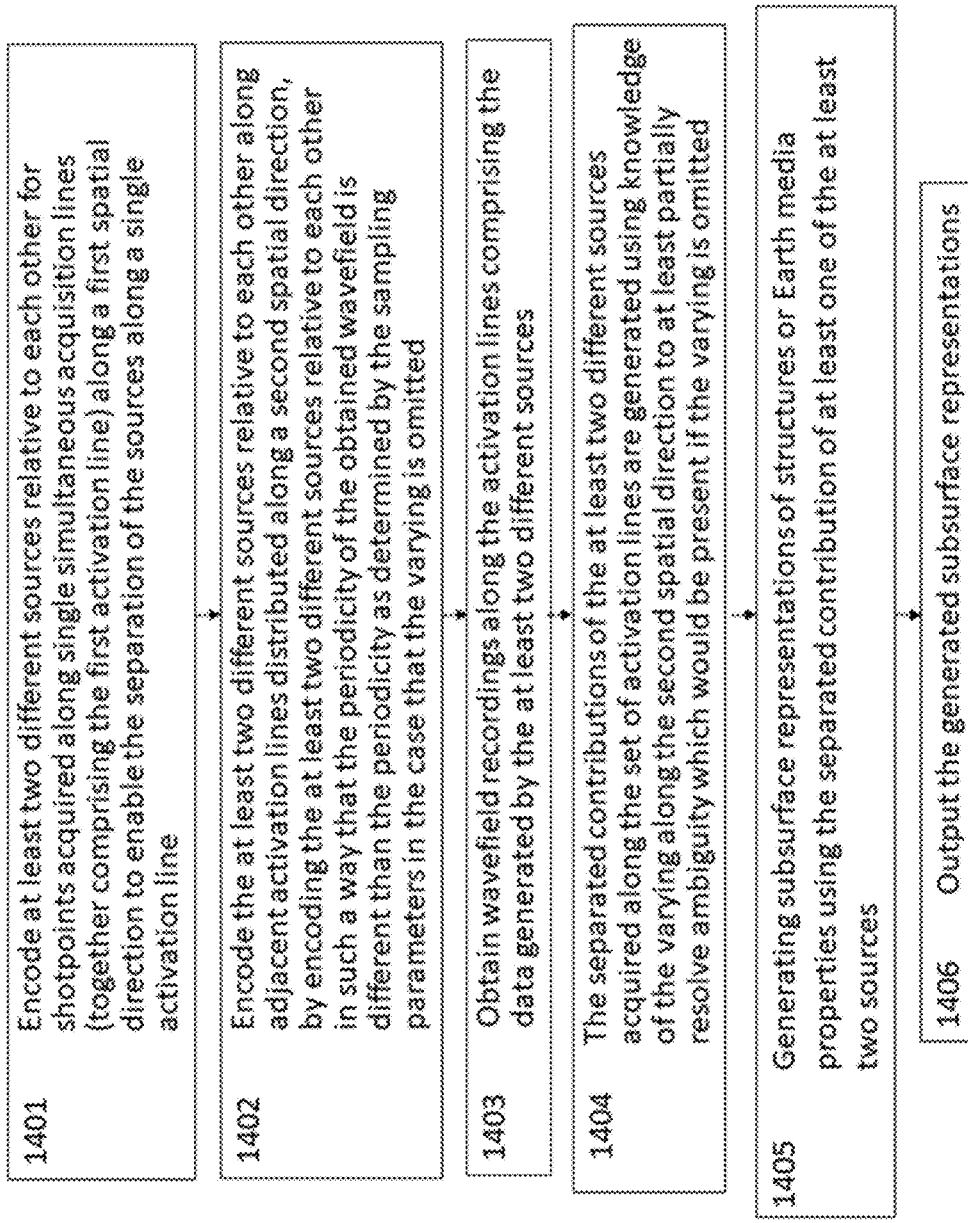
FIG. 14 Summarizes key steps for one embodiment of the methods disclosed herein.

In FIG. 14, the key steps for one embodiment of the methods disclosed herein are summarized. In a first step, 1401, at least two different sources are encoded relative to each other for shotpoints acquired along single simultaneous acquisition lines (together comprising the first activation line) along a first spatial direction to enable the separation of the sources along a single activation line. In a second step, 1402, the at least two different sources are encoded relative to each other along adjacent activation lines distributed along a second spatial direction, by encoding the at least two different sources relative to each other in such a way that the periodicity of the obtained wavefield is different than the periodicity as determined by the sampling parameters in the case that the varying is omitted, using the encoding methods disclosed herein. In a third step, 1403, wavefield recordings are obtained along the activation lines comprising the data generated by the at least two different sources. In a fourth step, 1404, the separated contributions from the at least two different sources acquired along the set of activation lines are generated (decoded) using the methods disclosed herein and in particular using knowledge of the varying along the second spatial direction to at least partially resolve ambiguity which would be present in the case that the varying is omitted. In a fifth step, 1405, subsurface representations of structures or Earth media properties are generated using the separated contribution of at least one of the at least two sources. In a sixth step, 1406, the generated subsurface representations are output.

In the description of the embodiments of the invention it is clear that acquisition lines or source lines do not necessarily need to be straight lines but can correspond to curved trajectories in the acquisition plane. It is also clear that in such a case, the term spatial directions is used to denote the path describing these trajectories.

The methods described herein may be understood as a series of logical steps and (or grouped with) corresponding numerical calculations acting on suitable digital representations of the acquired seismic recordings, and hence can be implemented as computer programs or software comprising sequences of machine-readable instructions and compiled code, which, when executed on the computer produce the intended output in a suitable digital representation. More specifically, a computer program can comprise machine-readable instructions to perform the following tasks:

(1) Reading all or part of a suitable digital representation of the obtained wave field quantities into memory from a (local) storage medium (e.g., disk/tape), or from a (remote) network location;

(2) Repeatedly operating on the all or part of the digital representation of the obtained wave field quantities read into memory using a central processing unit (CPU), a (general purpose) graphical processing unit (GPU), or other suitable processor. As already mentioned, such operations may be of a logical nature or of an arithmetic (i.e., computational) nature. Typically the results of many intermediate operations are temporarily held in memory or, in case of memory intensive computations, stored on disk and used for subsequent operations; and (3) Outputting all or part of a suitable digital representation of the results produced when there no further instructions to execute by transferring the results from memory to a (local) storage medium (e.g., disk/tape) or a (remote) network location.

Computer programs may run with or without user interaction, which takes place using input and output devices such as keyboards or a mouse and display. Users can influence the program execution based on intermediate results shown on the display or by entering suitable values for parameters that are required for the program execution. For example, in one embodiment, the user could be prompted to enter information about e.g., the average inline shot point interval or source spacing. Alternatively, such information could be extracted or computed from metadata that are routinely stored with the seismic data, including for example data stored in the so-called headers of each seismic trace.

Figure 15:
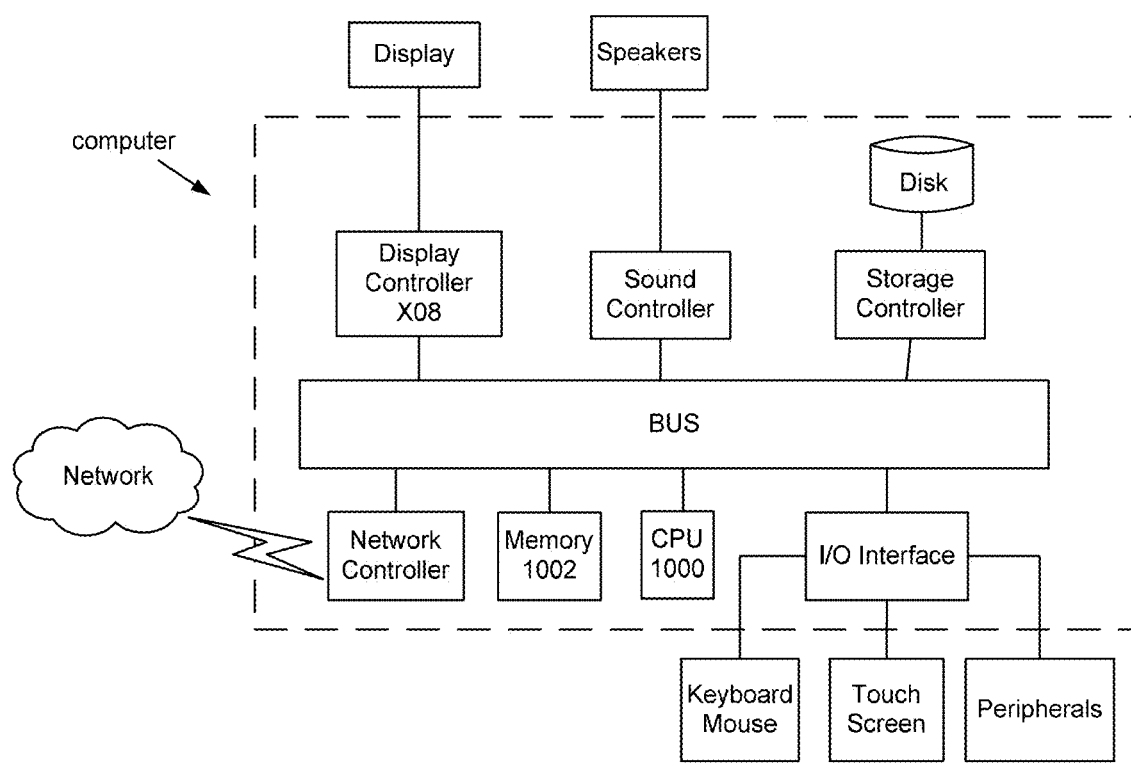
FIG. 15 Illustrates how the methods herein may be computer-implemented.

Next, a hardware description of a computer or computers used to perform the functionality of the above-described exemplary embodiments is described with reference to FIG. 15. In FIG. 15, the computer includes a CPU 1000 (an example of "processing circuitry") that performs the processes described above. The process data and instructions may be stored in memory 1002. These processes and instructions may also be stored on a storage medium disk such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which computer communicates, such as a server or another computer.

Further, the claimed advancements may be provided as a utility application, background daemon, or component of an operating system, or combination thereof, executing in conjunction with CPU 1000 and an operating system such as Microsoft Windows 10, UNIX, Solaris, LINUX, Apple MAC-OS and other systems known to those skilled in the art.

The hardware elements in order to achieve the computer can be realized by various circuitry elements, known to those skilled in the art. For example, CPU 1000 can be a Xenon or Core processor from Intel of America or an Opteron processor from AMD of America, or may be other processor types that would be recognized by one of ordinary skill in the art (for example so-called GPUs or GPGPUs). Alternatively, the CPU 1000 can be implemented on an FPGA, ASIC, PLD or using discrete logic circuits, as one of ordinary skill in the art would recognize. Further, CPU 1000 may be implemented as multiple processors cooperatively working in parallel to perform the instructions of the inventive processes described above.

LIST OF CITED REFERENCES

[Abma et al., 2015] R. Abma, D. Howe, M. Foster, I. Ahmed, M. Tanis, Q. Zhang, A. Arogunmati and G. Alexander, Geophysics. 80, WD37 (2015).
[Akerberg et al., 2008] Akerberg, P., Hampson, G., Rickett, J., Martin, H., and Cole, J., 2008, Simultaneous source separation by sparse Radon transform: 78th Annual International Meeting, SEG, Expanded Abstracts, 2801-2805, doi:10.1190/1.3063927.
Andersson, F., Eggenberger, K., van Manen, D. J., Robertsson, J. O. A., and Amundsen, L., 2016, Seismic apparition dealiasing using directionality regularization: 2016 SEG annual meeting, Dallas.
[Andersson et al., 2017] Andersson, F., Robertsson, J. O. A., van Manen, D. J., Wittsten, J., Eggenberger, K., and Amundsen, L., 2017, Express Letters: Flawless diamond separation in simultaneous source acquisition by seismic apparition: Geophysical Journal International, 209 (3), 1735-1739.
[Beasley et al., 1998] Beasley, C. J., Chambers, R. E., and Jiang, Z., 1998, A new look at simultaneous sources: 68th Annual International Meeting, SEG, Expanded Abstracts, 133-136.
[Bracewell, 1999] R. Bracewell, *The Fourier Transform & Its Applications* (McGraw-Hill Science, 1999).
[Halliday et al., 2014] Halliday and Laws, Seismic acquisition using phase-shifted sweeps: US Patent application US20140278119A1 (2014).
[Hager, 2016] Hager, E., 2016, Marine Seismic Data: Faster, Better, Cheaper?: GeoExpro, Vol. 13.
[Hamilton, 1844] W. R. Hamilton, "Ii. on quaternions; or on a new system of imaginaries in algebra." The London, Edinburgh, and Dublin Philosophical Magazine and Journal of Science 25.163: 10-13, (1844).
[Ikelle, 2010] L. T. Ikelle, *Coding and Decoding: Seismic Data: The Concept of Multishooting*. (Elsevier, 2010), Vol. 39.
[Kumar et al., 2015] R. Kumar, H. Wason and F. J. Herrmann, Geophysics. 80, WD73 (2015).
[Lynn et al., 1987] Lynn, W., Doyle, M., Larner, K., and Marschall, R., 1987, Experimental investigation of interference from other seismic crews: Geophysics, 52, 1501-1524.
[Moldoveanu et al., 2008] Moldoveanu, N., Kapoor, J., and Egan, M., 2008, Full-azimuth imaging using circular geometry acquisition: The Leading Edge, 27(7), 908-913. doi: 10.1190/1.2954032
[Mueller et al., 2015] M. B. Mueller, D. F. Halliday, D. J. van Manen and J. O. A. Robertsson, Geophysics. 80, V133 (2015).
[Robertsson et al., 2012] Robertsson, J. O. A., Halliday, D., van Manen, D. J., Vasconcelos, I., Laws, R., Ozdemir, K., and Gronaas, H., 2012, Full-wavefield, towed-marine seismic acquisition and applications: 74th Conference and Exhibition, EAGE, Extended Abstracts.
[Robertsson et al., 2016] Robertsson, J. O. A., Amundsen, L., and Pedersen, Å. S., 2016, Express Letter: Signal apparition for simultaneous source wavefield separation: Geophys. J. Int., 206(2), 1301-1305: doi: 10.1093/gji/ggw210.
[Shipilova et al., 2016] Shipilova, E., Barone, I., Boelle, J. L., Giboli, M., Piazza, J. L., Hugonnet, P., and Dupinet, C., 2016, Simultaneous-source seismic acquisitions: do they allow reservoir characterization? A feasibility study with blended onshore real data: 86th Annual International Meeting, SEG, Expanded Abstracts.
[Smith, 1995]. J. D. H. Smith, "A left loop on the 15-sphere." Journal of Algebra 176.1:128-138 (1995).
[Stefani et al., 2007] Stefani, J., Hampson, G., and Herkenhoff, E. F., 2007, Acquisition using simultaneous sources: 69th Annual International Conference and Exhibition, EAGE, Extended Abstracts, B006.
[van der Blij, F. 1961] F. van der Blij, "History of the octaves." Simon Stevin 34 1961: 106-125.
[Ziolkowski, 1987] Ziolkowski, A. M., 1987, The determination of the far-field signature of an interacting array of marine seismic sources from near-field measurements: Results from the Delft Air Gun experiment: First Break, 5, 15-29.

The invention claimed is:
1. A method for separating sources, comprising:
obtaining, by at least one receiver, wavefield recordings of an underlying continuous wavefield that has conic support in a temporal-spatial frequency-wavenumber domain, based on a synchronous activation of at least two separate sources moved from shotpoint to shotpoint along a first spatial direction, and repeating the activation along two or more activation lines, wherein the two or more activation lines are distributed along a second spatial direction and each activation line comprises separate lines corresponding to the at least two separate sources;

varying at least one parameter between the at least two sources from one activation to a following activation along at least one of the first and second spatial directions, the at least one parameter being at least one of source signal amplitude, source signal spectrum, source activation time, source location at activation time, and source depth, such that the varying causes support of the frequency-wavenumber representation of the obtained wavefield to be a union of at least two shifted replicas of the support of the frequency-wavenumber representation of the continuous wavefield in at least one of the first and second spatial directions, wherein the frequency-wavenumber representation of information contained in the continuous wavefield is distributed, by means of the varying, to the obtained wavefield so that a periodicity of the obtained wavefield is different than a periodicity as determined by the sampling parameters when the varying is omitted;

using knowledge of the varying, at least partially resolving ambiguity present when the varying is omitted, to generate separated contributions of at least one of the at least two sources;

generating subsurface representations of structures or Earth media properties using the separated contributions of the at least one of the at least two sources; and outputting the generated subsurface representations.

2. The method of claim 1, further comprising reconstructing the separated contributions of the at least one of the at least two sources up to a temporal frequency that is higher than a corresponding temporal frequency when the varying is omitted.

3. The method of claim 1, further comprising reconstructing the separated contributions of the at least one of the at least two sources up to a temporal frequency that is higher than a corresponding temporal frequency when considering only data along a single activation line.

4. The method of claim 1, wherein the varying of the at least one parameter is periodic.

5. The method of claim 4, wherein the varying of the at least one parameter comprises time shifting by time shifts that are smaller than 100 ms with respect to a firing time of individual sources.

6. The method of claim 1, wherein the varying of the at least one parameter comprises superposing multiplying at least two varying functions, wherein at least one of the at least two varying functions is periodic.

7. The method of claim 1, wherein the varying of the at least one parameter is one of random, naturally random by acquisition, pseudo-random, and quasi-random.

8. The method of claim 7, wherein the varying of the at least one parameter is a time dither greater than 100 ms.

9. The method of claim 1, further comprising at least one of dealiasing and reconstructing to recover the continuous wavefield beyond the temporal frequency below which the ambiguity has been resolved.

10. The method of claim 9, wherein the at least one of dealiasing and reconstructing comprises forming an analytic part of recorded wavefield information, extracting a non-aliased representation of a part of the recorded wavefield information, forming a phase factor from a conjugate part of an analytic part of the non-aliased representation, combining the analytic part of the recorded wavefield information with the phase factor to derive an essentially non-aliased function, applying a filtering operation to the non-aliased function, and recombining the filtered non-aliased function with the non-conjugated phase factor to reconstruct a representation of essentially dealiased recorded wavefield information.

11. The method of claim 9, wherein the at least one of the dealiasing and reconstructing further comprises iteratively forming analytic parts from parts of the at least one of the dealiasing and reconstruction, and using the analytic parts in solvers of linear systems to increase a range of the parts of the at least one of the dealiasing and reconstruction.

12. The method of claim 9, wherein a quaternion analytic part is used instead of the analytic part.

13. The method of claim 1, wherein the obtaining step comprises obtaining the wavefield recordings, which are marine seismic data or seabed seismic data, wherein the sources are towed by a same vessel.

14. The method of claim 13, wherein airguns or marine vibroseis devices are used as seismic sources.

15. The method of claim 1, wherein the obtaining step comprises obtaining the wavefield recordings, which are marine seismic data or seabed seismic data, and wherein the sources are towed by at least two different vessels.

16. The method of claim 1, wherein at least one of the at least two sources is towed at a greater depth than other sources such that each source exhibits different notch frequencies to provide a broadband source effect for all of the at least two sources for wavelengths corresponding to and below a certain frequency.

17. The method of claim 1, wherein the wavefield is obtained at locations corresponding to a Bravais grid.

18. The method of claim 1, wherein a number of the activation lines is eight or more, and a number of the shot points along an activation line is eight or more.

19. The method of claim 1, wherein the varying of the at least one parameter between the at least two sources from one activation to a next is source activation time, and a difference in source activation time between at least two of the sources is smaller than 50 ms to enable constructive interference of an emitted signal of the at least two sources at frequencies below 6 Hz.

20. The method of claim 1, wherein the at least two sources are located within 750 m from each other to enable constructive interference of an emitted signal of the at least two sources below 4 Hz.

* * * * *